United States Patent
Cai et al.

(10) Patent No.: US 12,499,946 B2
(45) Date of Patent: Dec. 16, 2025

(54) RELIABILITY IMPROVEMENT THROUGH DELAY BETWEEN MULTI-STAGE PROGRAMMING STEPS IN NON-VOLATILE MEMORY STRUCTURES

(71) Applicant: SanDisk Technologies, Inc., Milpitas, CA (US)

(72) Inventors: Xue Qing Cai, Fremont, CA (US); Henry Chin, Fremont, CA (US); Jiahui Yuan, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 162 days.

(21) Appl. No.: 17/847,831

(22) Filed: Jun. 23, 2022

(65) Prior Publication Data
US 2023/0420051 A1 Dec. 28, 2023

(51) Int. Cl.
| | | |
|---|---|---|
| *G11C 16/04* | (2006.01) | |
| *G11C 11/56* | (2006.01) | |
| *G11C 16/10* | (2006.01) | |
| *G11C 16/32* | (2006.01) | |
| G11C 16/26 | (2006.01) | |
| H10B 41/27 | (2023.01) | |

(52) U.S. Cl.
CPC .......... *G11C 16/10* (2013.01); *G11C 11/5628* (2013.01); *G11C 16/0483* (2013.01); *G11C 16/32* (2013.01); *G11C 16/26* (2013.01); *H10B 41/27* (2023.02)

(58) Field of Classification Search
CPC . G11C 16/10; G11C 11/5628; G11C 16/0483; G11C 16/32; G11C 16/26; G11C 16/08; G11C 2211/5648; G11C 11/5671; H10B 41/27; H10B 43/27
USPC ..................................................... 365/185.03
See application file for complete search history.

(56) References Cited

U.S. PATENT DOCUMENTS

| | | | |
|---|---|---|---|
| 8,179,720 B2 * | 5/2012 | Fukuda .............. | G11C 16/3436 365/185.23 |
| 9,269,445 B1 * | 2/2016 | Abe ...................... | G11C 16/10 |
| 9,552,171 B2 * | 1/2017 | Huang ................ | G11C 16/0483 |
| 9,704,588 B1 * | 7/2017 | Ray ..................... | G11C 16/0483 |
| 9,721,652 B2 | 8/2017 | Puthenthermadam et al. | |
| 9,721,672 B1 | 8/2017 | Dutta et al. | |
| 10,055,267 B2 * | 8/2018 | Agarwal ............... | G11C 29/08 |
| 10,510,413 B1 | 12/2019 | Diep et al. | |
| 10,748,627 B2 | 8/2020 | Chen et al. | |
| 10,796,766 B2 | 10/2020 | Joe et al. | |

(Continued)

*Primary Examiner* — Tha-O H Bui
(74) *Attorney, Agent, or Firm* — Dickinson Wirght PLLC

(57) ABSTRACT

A method for multi-stage programming of a non-volatile memory structure includes the step of initiating a programming operation with respect to a memory block. The method also includes the step of applying a programming algorithm to the memory block. The programming algorithm comprises at least a first programming stage and a second programming stage. Between the first programming stage and the second programming stage, the method additionally includes applying a time delay according to a pre-determined amount of time. Further, the pre-determined amount of time may be defined as the amount of time that, according to a probabilistic function, permits de-trapping of any charges unintentionally trapped within a memory cell of the memory block as a result of the first programming stage.

17 Claims, 21 Drawing Sheets

(56) References Cited

U.S. PATENT DOCUMENTS

| | | |
|---|---|---|
| 2007/0036001 A1* | 2/2007 | Kanda .................... G11C 16/12 365/185.18 |
| 2016/0224267 A1 | 8/2016 | Yang et al. |
| 2020/0082878 A1 | 3/2020 | Papandreou et al. |
| 2020/0202938 A1 | 6/2020 | Reina |
| 2020/0402582 A1 | 12/2020 | Yang et al. |
| 2021/0366560 A1 | 11/2021 | Salahuddin et al. |
| 2021/0375376 A1 | 12/2021 | Gupta et al. |

\* cited by examiner

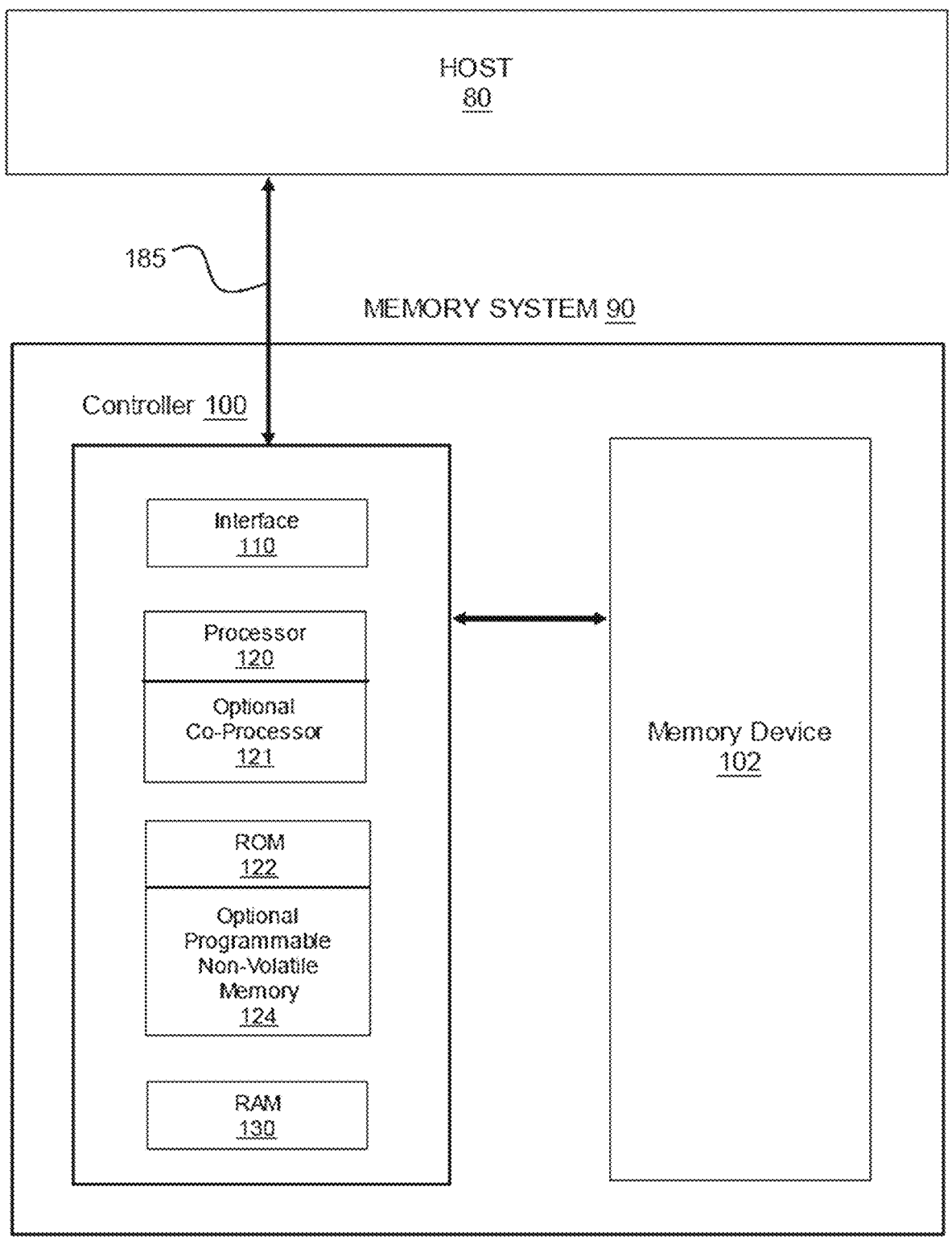
FIG. 1 -
PRIOR ART

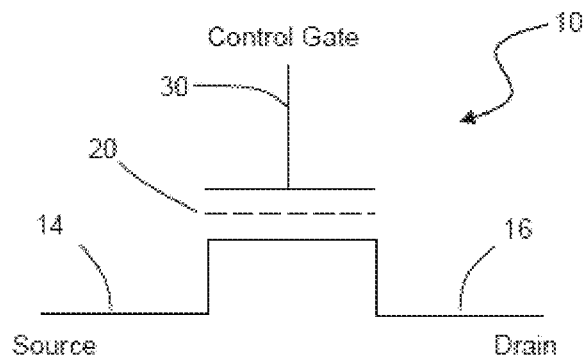
*FIG. 2 – PRIOR ART*
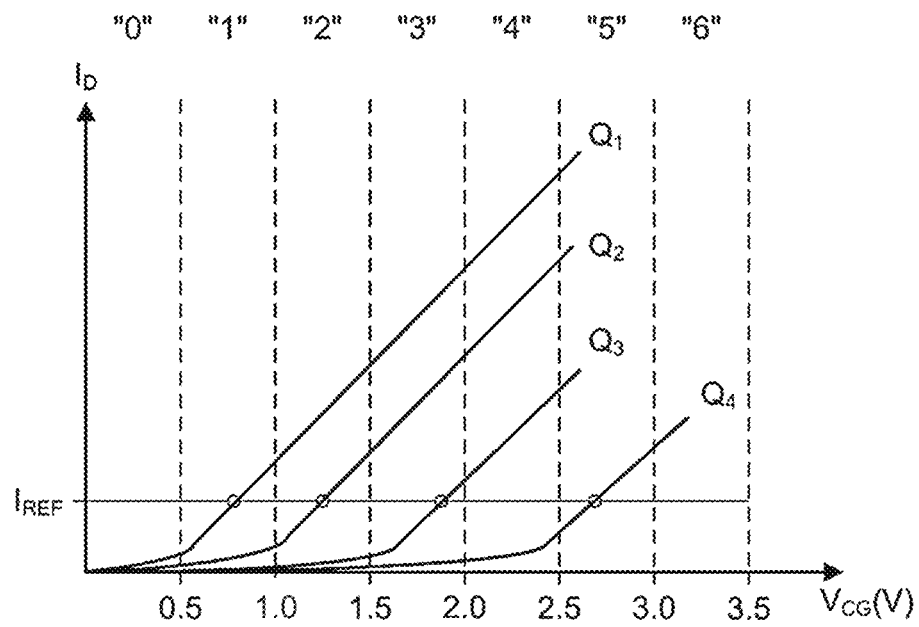
*FIG. 3 – PRIOR ART*

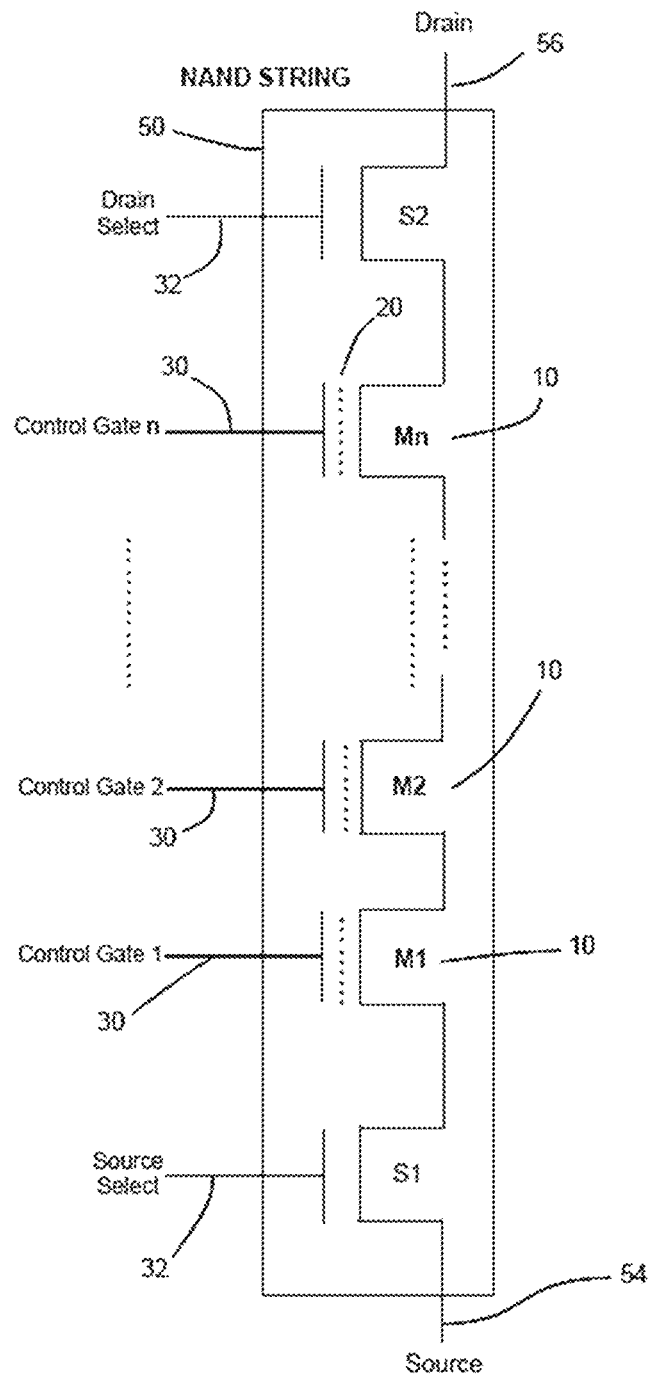
*FIG. 4A – PRIOR ART*

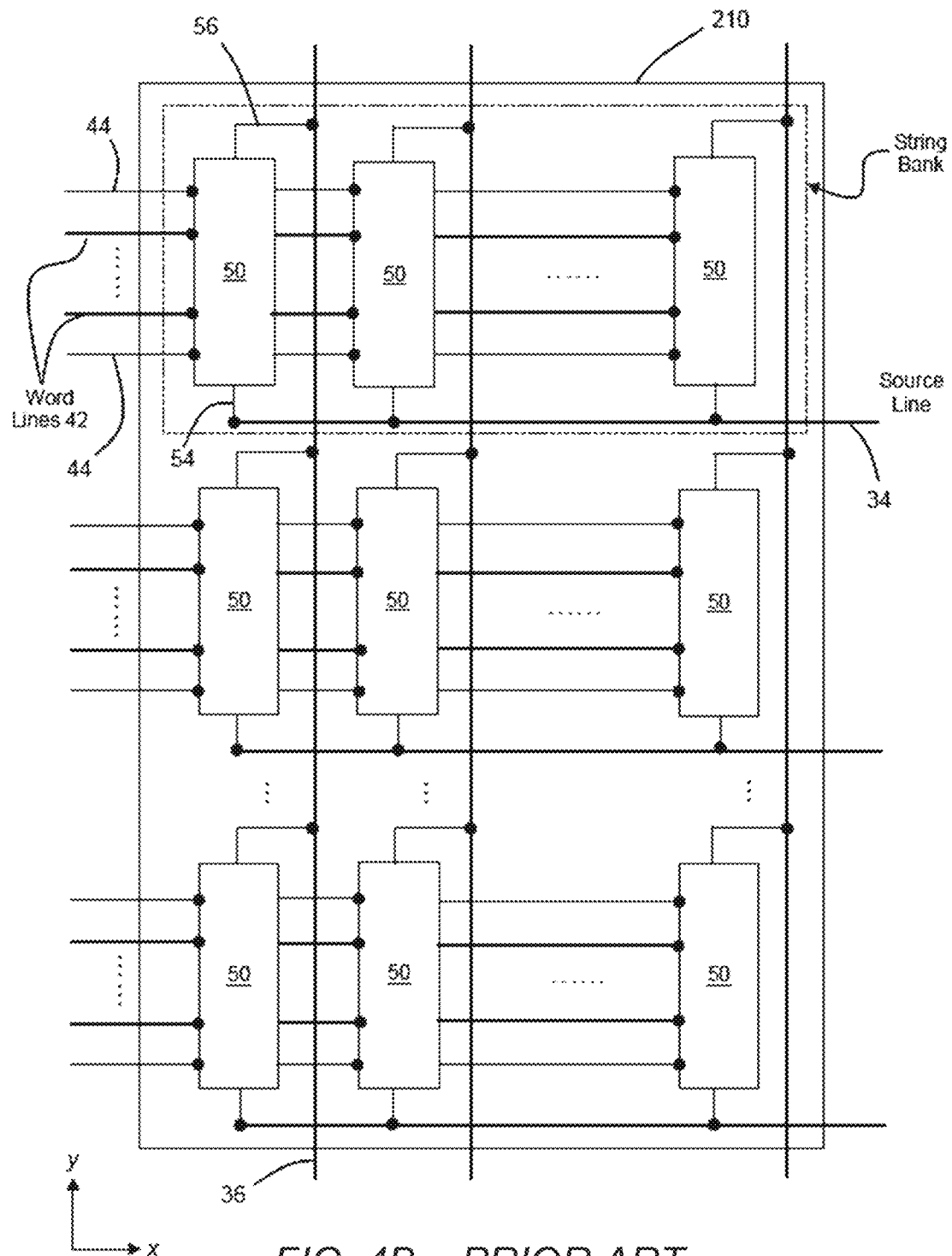
FIG. 4B – PRIOR ART

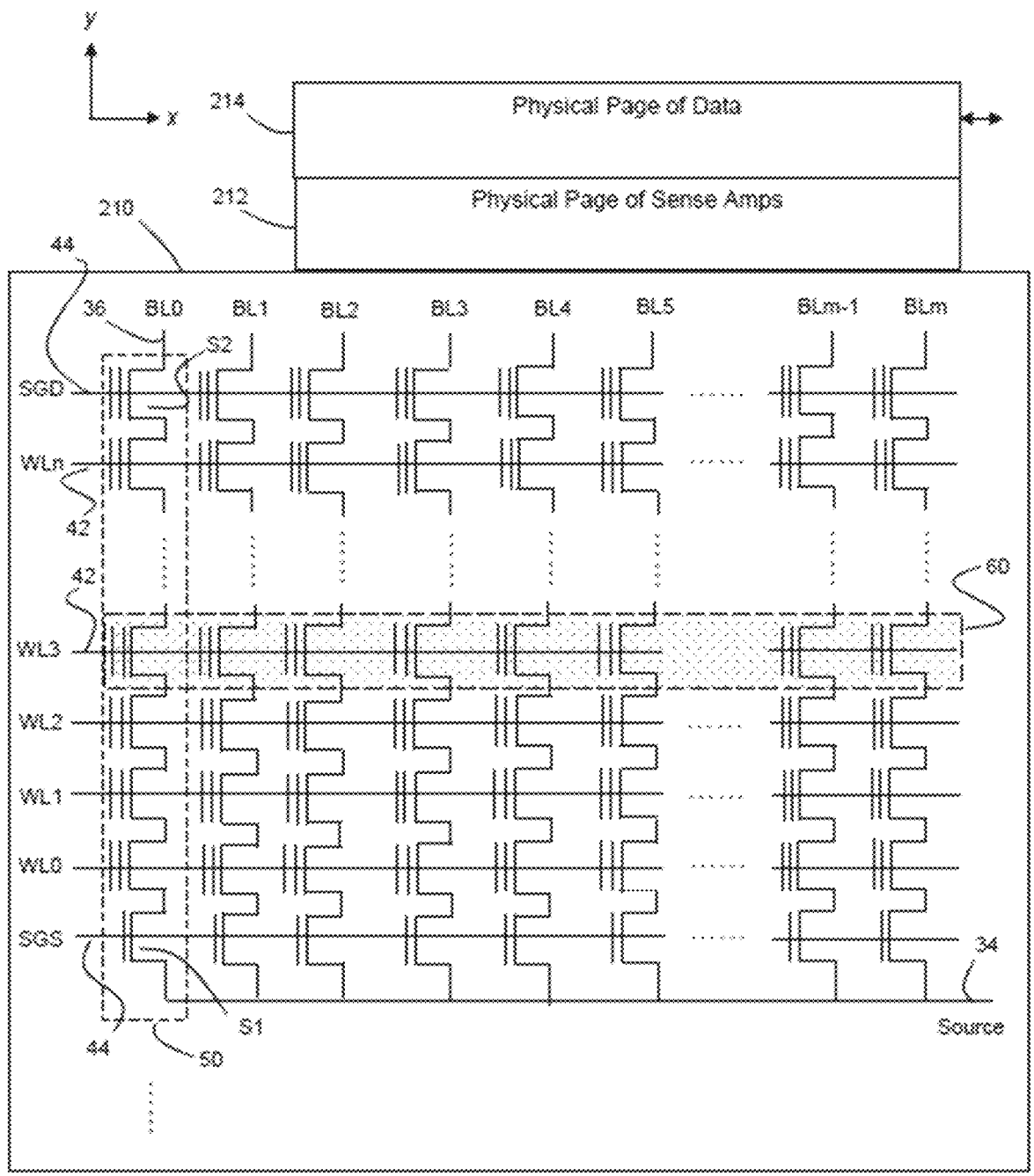
FIG. 5 – PRIOR ART

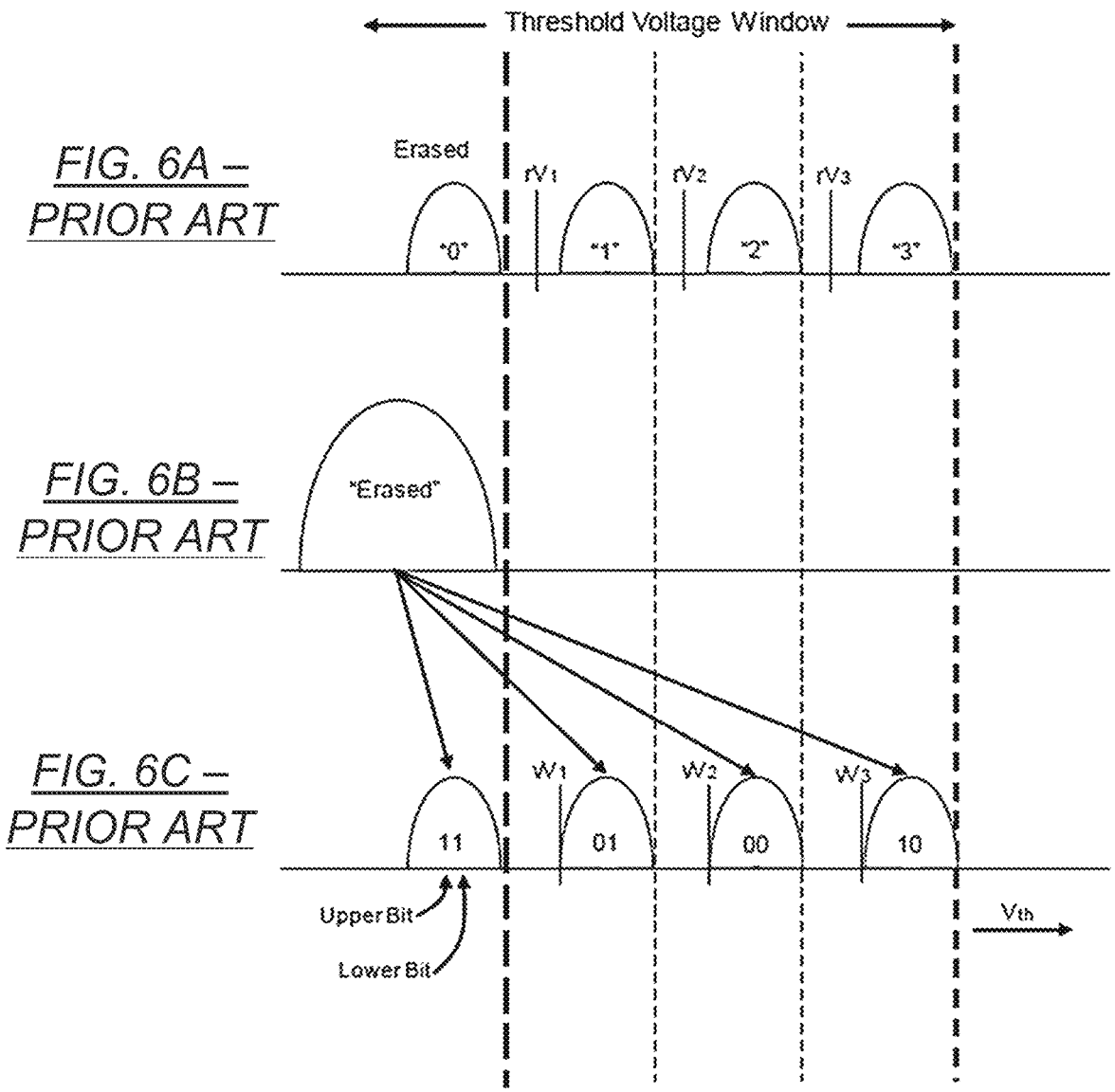

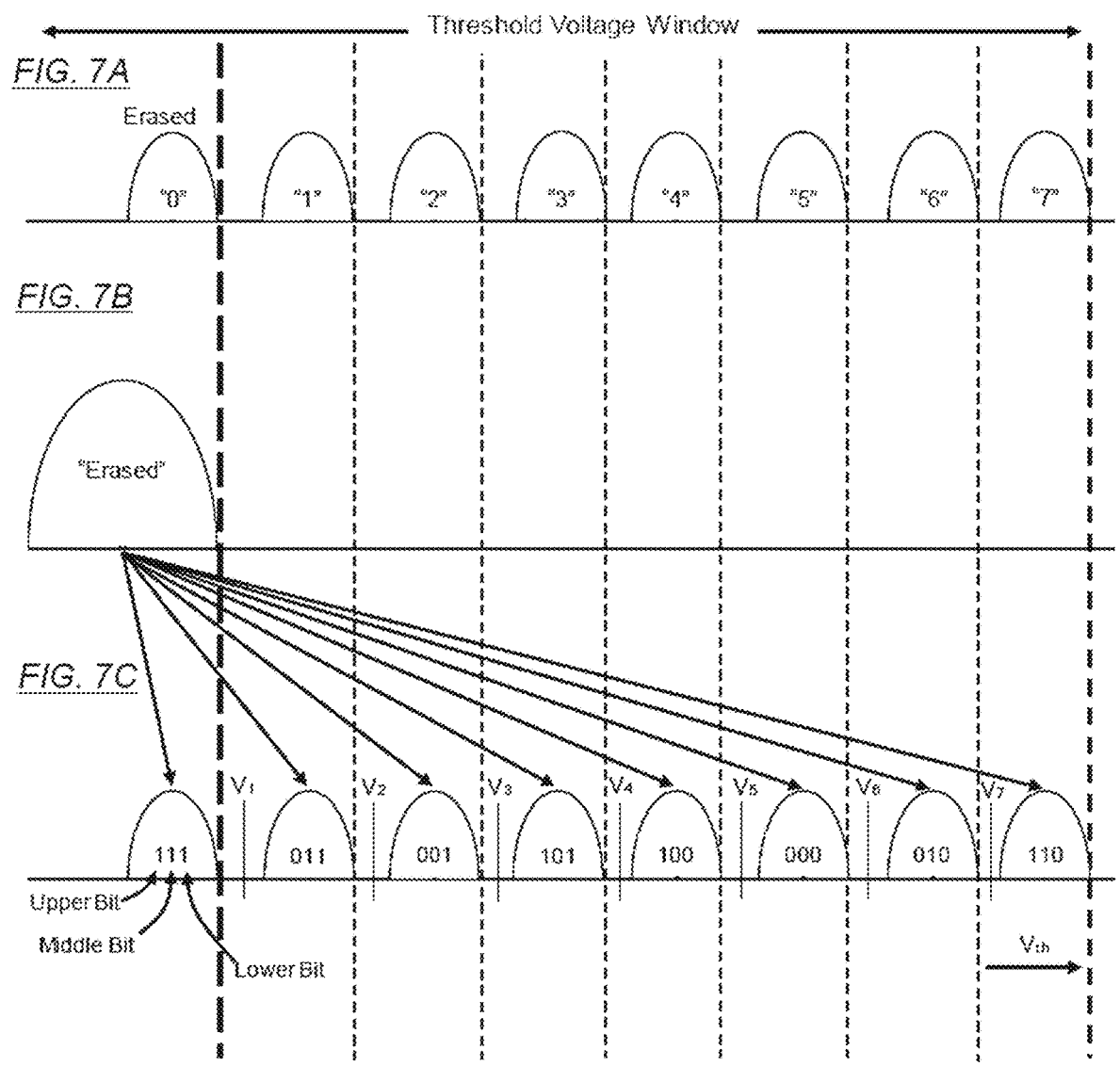

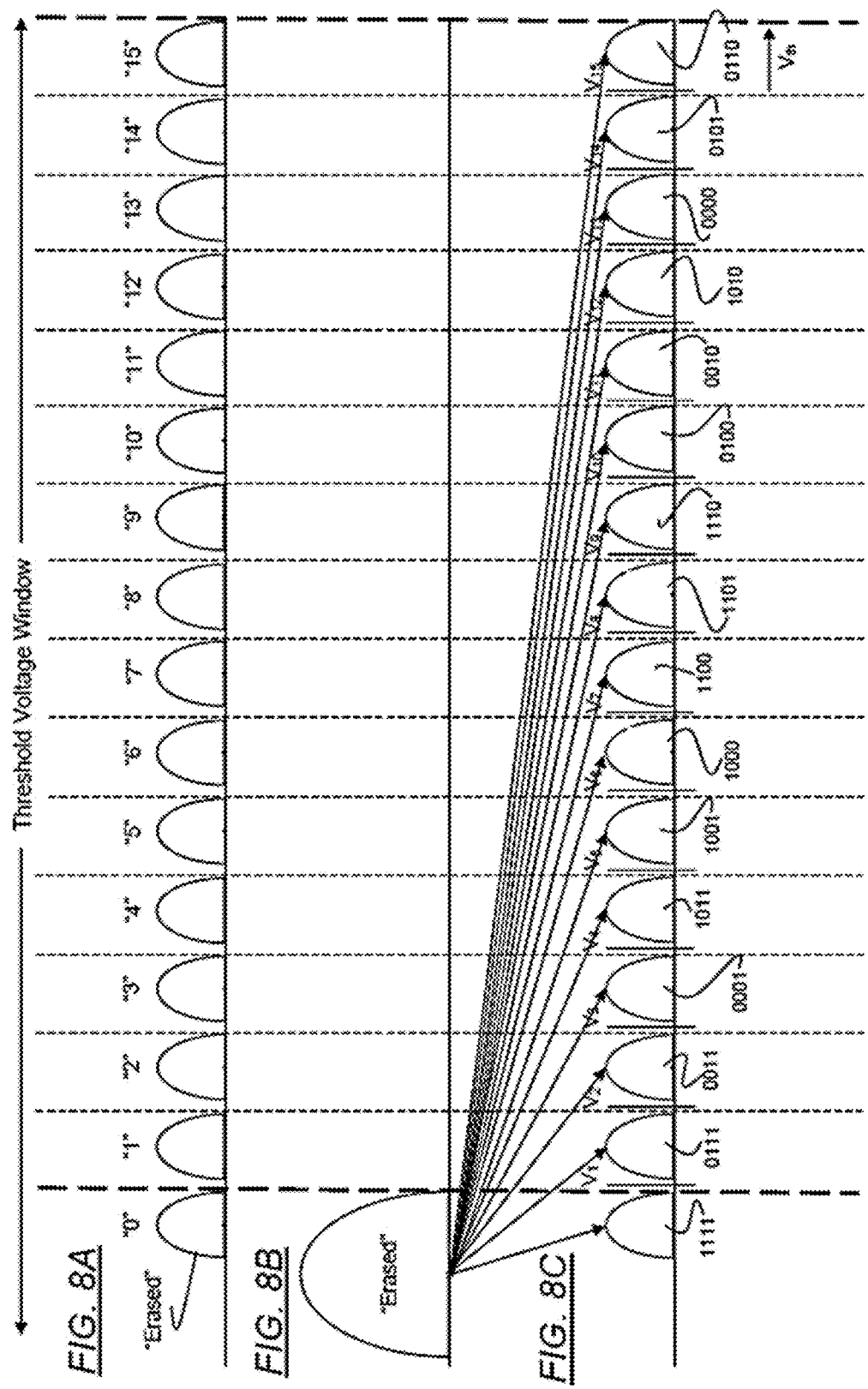

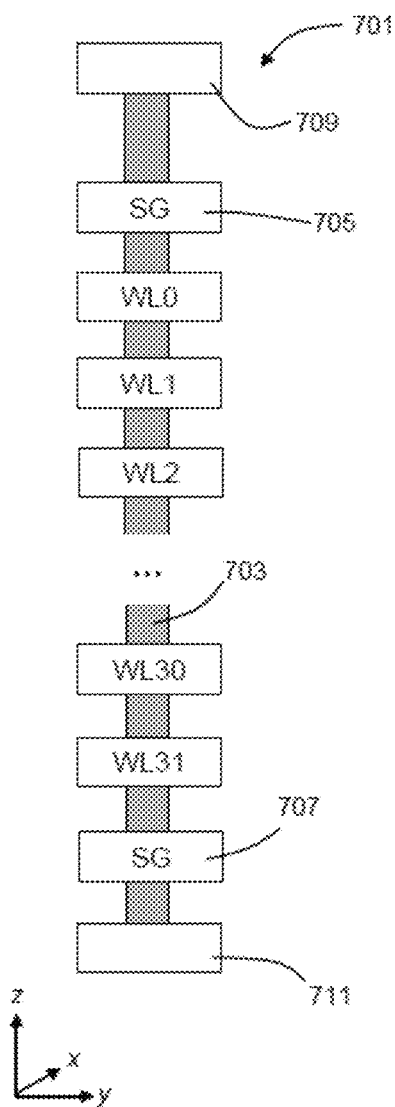
FIG. 9 – PRIOR ART

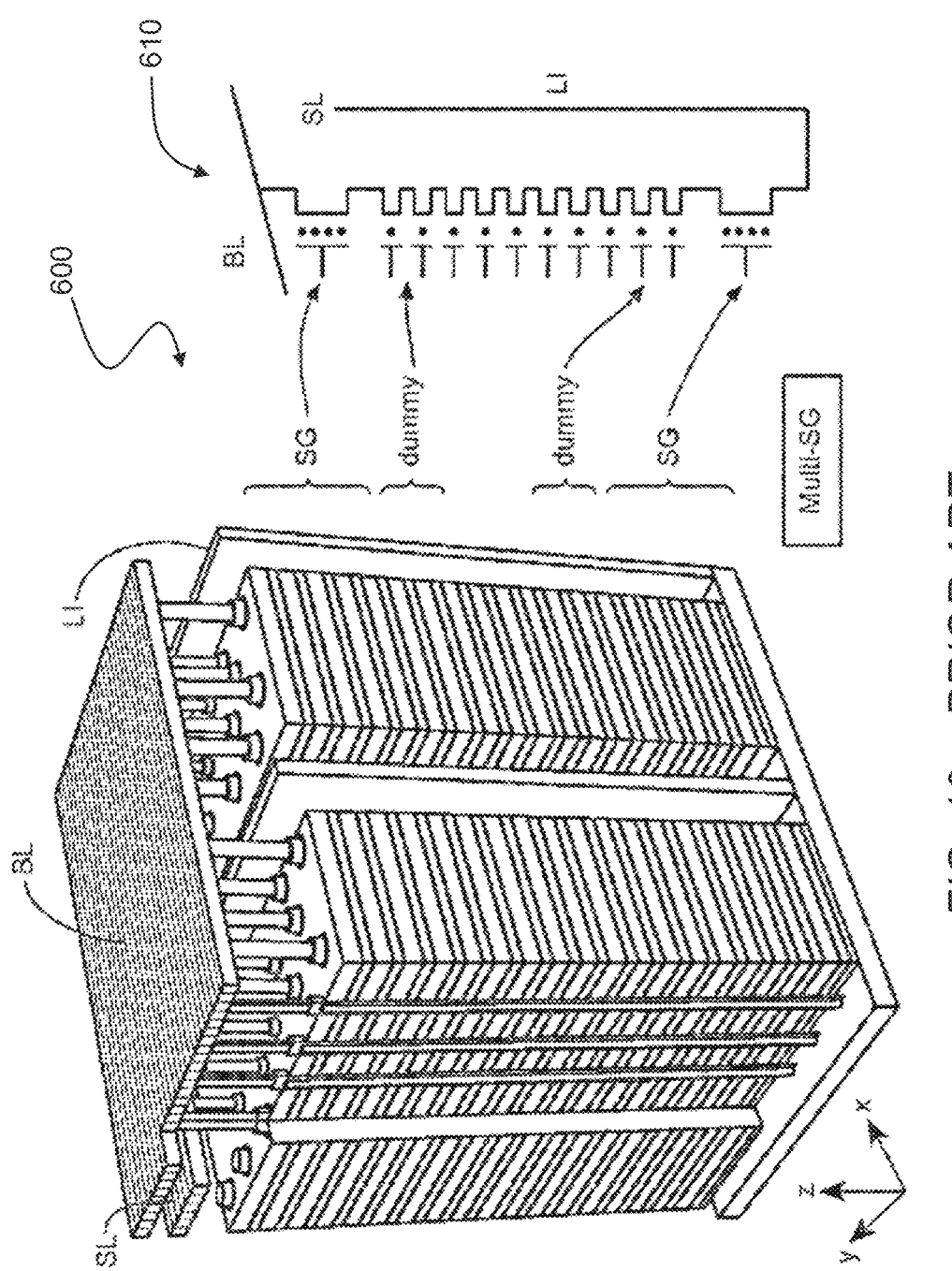
FIG. 10 – PRIOR ART

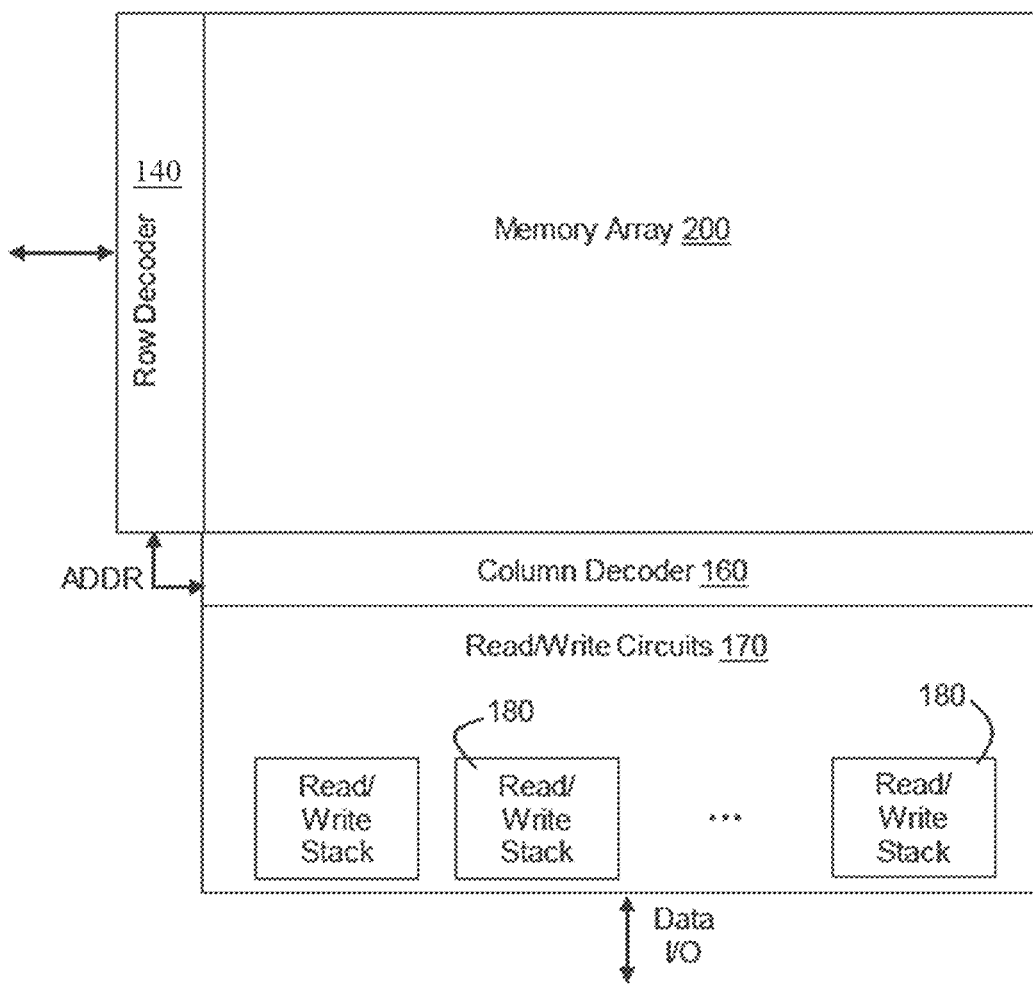
*FIG. 11 – PRIOR ART*
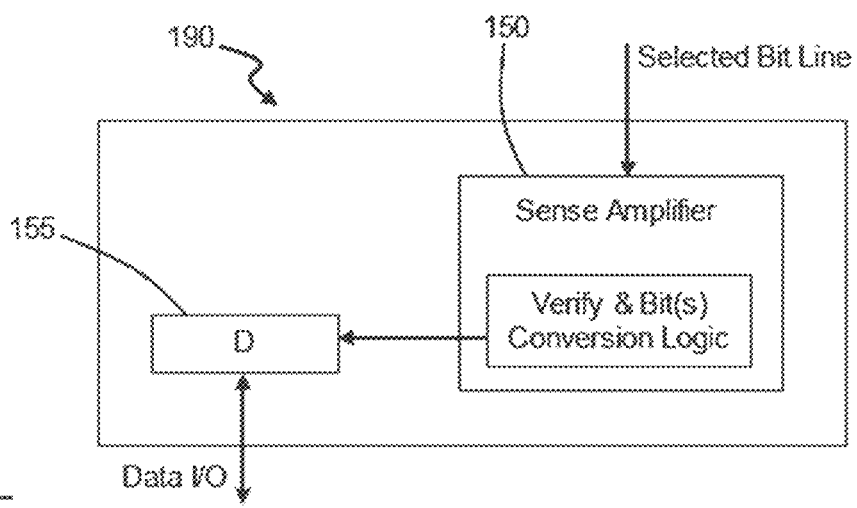
*FIG. 12 – PRIOR ART*

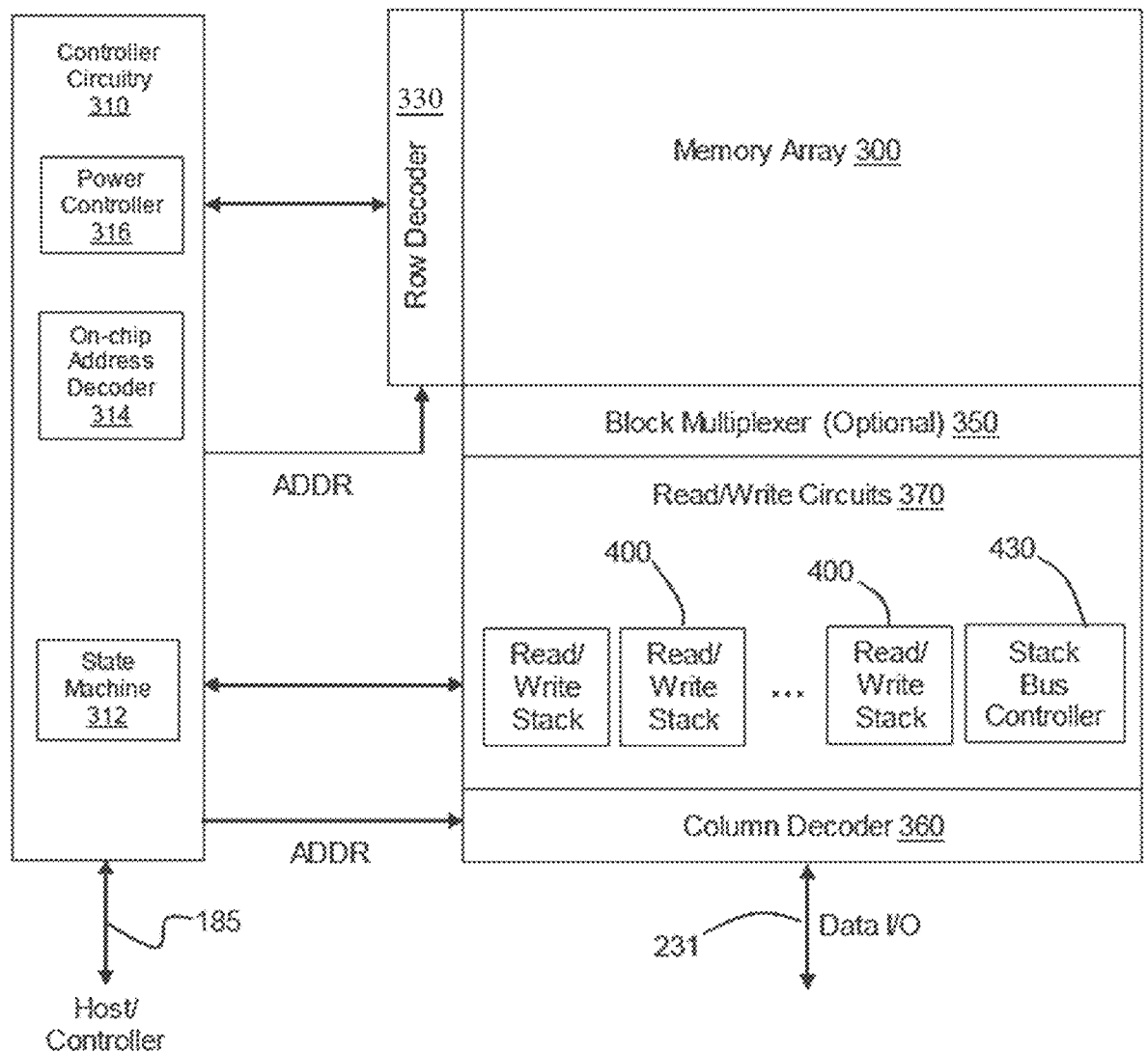
FIG. 13A – PRIOR ART

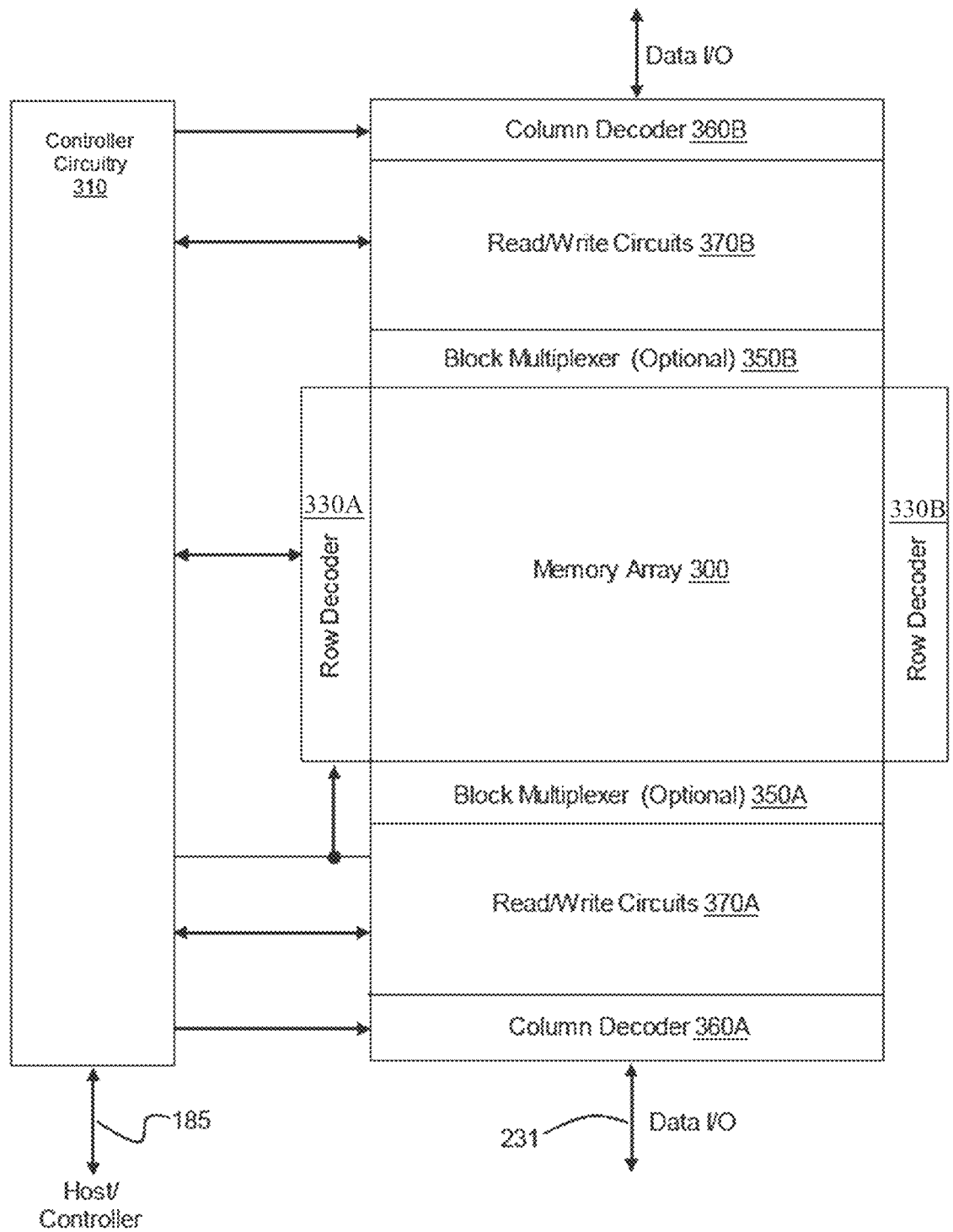
FIG. 13B – PRIOR ART

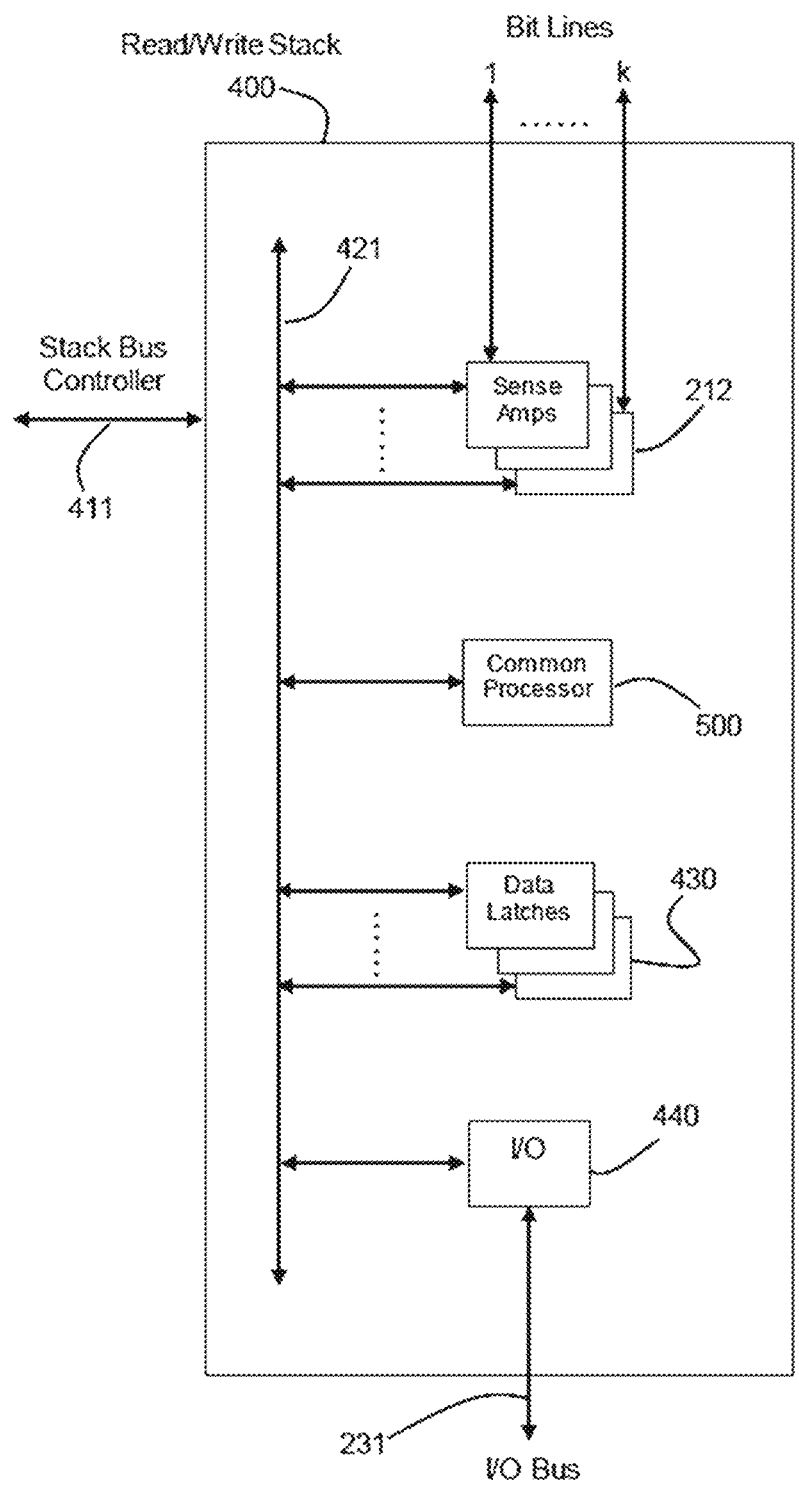
FIG. 14 – PRIOR ART

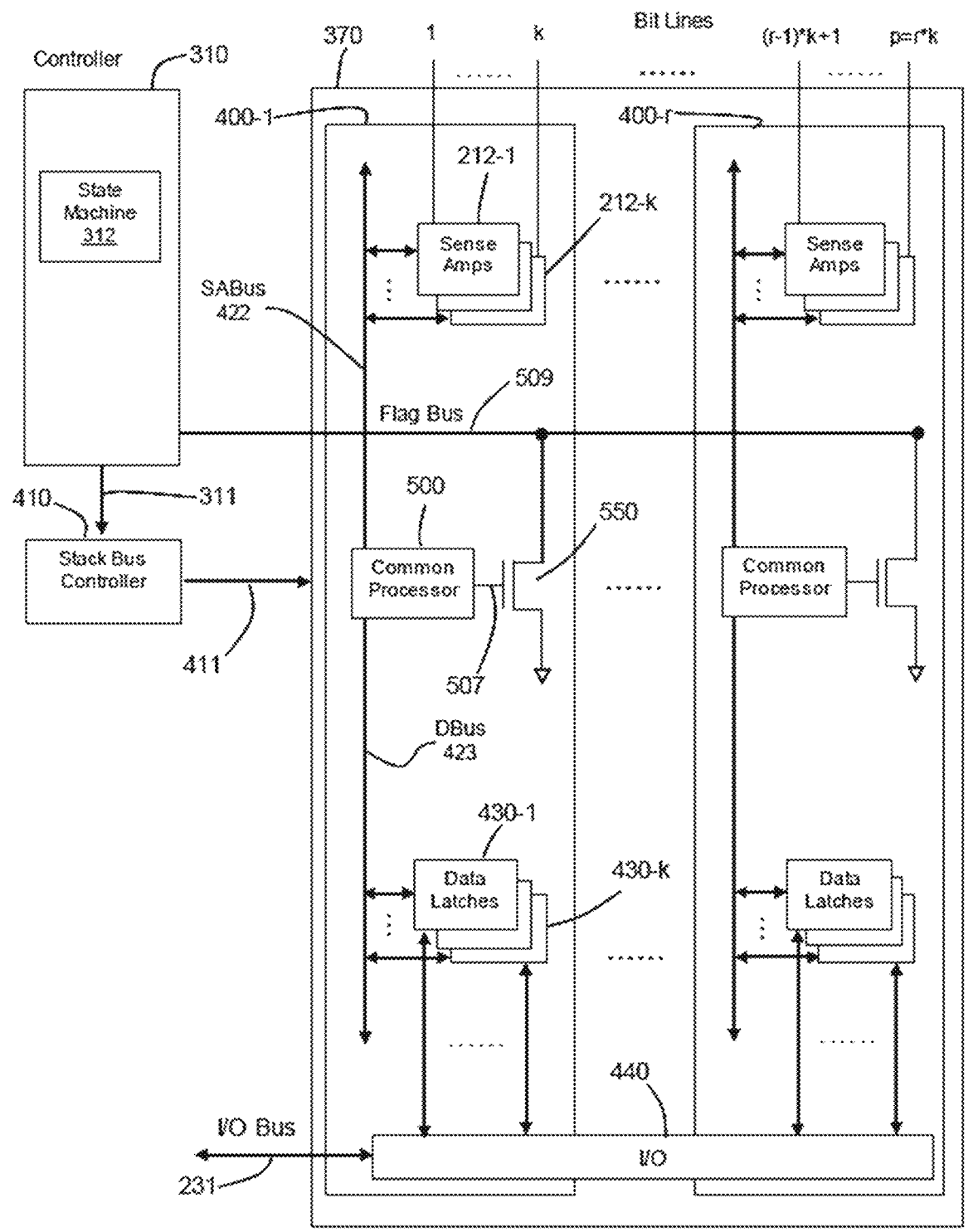
FIG. 15A – PRIOR ART

RELIABILITY IMPROVEMENT THROUGH DELAY BETWEEN MULTI-STAGE PROGRAMMING STEPS IN NON-VOLATILE MEMORY STRUCTURES

TECHNICAL FIELD

This disclosure relates to non-volatile memory storage systems in solid-state drives or other devices, including but not limited to flash drives or embedded/removable flash packages. More specifically, this disclosure relates to systems and methods for programming non-volatile memory structures.

BACKGROUND

Due to emerging technology and market forces, solid-state drives (SSDs) are steadily replacing previously conventional data storage systems that rely on the rotation of magnetic mediums for reading and writing data (e.g., hard disk drives). Rather than comprising any mechanical or moving parts, solid-state memory comprises integrated circuit assemblies or interconnected flash components to provide non-volatile storage in which stored data can be persistently retained even during a planned or unplanned interruption of power. As a result, a solid-state drive is inherently faster and more robust (i.e., less susceptible to data loss and corruption), as well as consumes less power and is more compact in comparison to disk-based storage. Accordingly, non-volatile memory is a powerful storage solution with respect to many types of computing, consumer electronic, and stand-alone external storage (e.g., USB drives) devices.

With respect to some flash memory types, each individual memory cell comprises a floating gate that is positioned above and isolated from a channel region of a semiconductor substrate, wherein the floating gate is positioned between the source and drain regions. Also, a control gate is provided over and isolated from the floating gate. Accordingly, the threshold voltage ($V_{th}$) of the resulting transistor is controlled by and dependent on the amount of charge retained on the floating gate. Specifically, in a switch-like manner, the minimum amount of voltage that must be applied to the control gate before the transistor is activated to permit conduction between its source and drain is determined by the level of charge retained on the floating gate. As a result, bit-value data can be programmed onto and erased from the memory cell by changing the level of charge on a floating gate in order to change the threshold voltage characteristic of the transistor.

As explained in detail below, the number of bits that can be stored in an individual memory cell is dependent upon the number of distinct voltage ranges that may be partitioned within the threshold voltage window of that memory cell. For example, to store one bit of data (referred to as a binary data), the possible threshold voltages ($V_{th}$) of the memory cell are divided into two ranges, wherein the ranges are assigned as logical data "1" and "0" respectively. A memory cell of this type of storage density may be referred to as a "single-level cell" or SLC.

By further partitioning the threshold voltage window of a memory cell into additional distinct voltage ranges, multiple levels of information may be stored. Such a memory cell may be referred to as a "multi-state cell." For example, to store two bits of data, the threshold voltage window of a cell may be partitioned into four distinct voltage ranges (or states), wherein each range is assigned a certain bit value equal to, for example, "11," "10," "01," and "00." Accordingly, after an erase operation, the threshold voltage is negative and, therefore, may be defined as logic "11." Therefore, the positive threshold voltages may be used for the states of "10," "01, "00." A memory cell of this storage density may be referred to as, for example, a "multi-level cell" or MLC. In another example, to store three bits of data, the voltage threshold window of a cell may be partitioned into eight distinct voltage ranges (or states), wherein each range is assigned a certain bit value that is equal to, for example, "111," "110," "100," "010," "011," "000," "001," and "101." A memory cell of this storage density may be referred to, for example, as a "tri-level" or "triple-level cell" (TLC). In a further example, to store four bits of data, the voltage threshold window of a cell may be partitioned into 16 distinct voltage ranges (or states), wherein each range is assigned a certain bit value that is equal to, for example, "1111," "1110," "1100," "1000," "0111," "0011," "0001," "0000," "0001," "1001," "1101," "1011," "0110," "0100," "0101," and "1010." A memory cell of this storage density may be referred to, for example, as a "quad-level cell" (QLC).

In addition to the increasing storage densities with respect to a single memory cell, advances in non-volatile memory array structures have led to memory cells being stacked in a vertical direction with respect to a semiconductor substrate, thereby creating a three-dimensional array structure as opposed to a planar two-dimensional array structure.

The specific relationship between the data that is programmed into a memory cell and the threshold voltage levels of the memory cell depends upon the data encoding scheme that is adopted for the memory cells.

Therefore, a memory device that comprises multi-state data (by incorporating MLC and/or TLC-type and/or QLC-type cells) has an increased storage capacity using the same MOSFET structure and wafer size as an SLC-type cell and, as a result, provides a beneficial comparative cost per bit savings. However, as a consequence of the increased density, vertical height, and tightened tolerances between the partitioned voltage ranges of multi-state memory structures, certain parasitic electrical behaviors inherent to the structure and operation of flash memory that negatively impact the programming and data reliability are more prominent and readily introduced. Therefore, it would be beneficial to derive and identify technologies and methodologies that, in one or more programming stages, operates to manage a parasitic effect, thereby improving upon or counteracting a downward progression in the data reliability of a memory structure.

SUMMARY

Various embodiments include a method for multi-stage programming of a non-volatile memory structure, wherein the method comprises: (1) initiating a programming operation with respect to a memory block, (2) applying a programming algorithm to the memory block, wherein the programming algorithm comprises at least a first programming stage and a second programming stage, and (3) between the first programming stage and the second programming stage, applying a time delay according to a pre-determined amount of time.

Other embodiments include a memory controller comprising: (1) a communication pathway configured to couple to a memory array of a non-volatile memory structure, and (2) the memory controller is configured to: (i) initiate a programming operation with respect to the memory block, (ii) apply a programming algorithm to the memory block, wherein the programming algorithm comprises at least a first programming stage and a second programming stage, and (iii) between the first programming stage and the second programming stage, apply a time delay according to a pre-determined amount of time.

Additional embodiments include a non-volatile memory system that comprises: (1) a memory block comprising a population of NAND-type memory cells, and (2) a memory controller coupled to the memory array and: (i) initiating a programming operation with respect to the memory block, (ii) applying a programming algorithm to the memory block, wherein the programming algorithm comprises at least a first programming stage and a second programming stage, and (iii) between the first programming stage and the second programming stage, applying a time delay according to a pre-determined amount of time.

Further, the pre-determined amount of time may be defined as the amount of time that, according to a probabilistic function, permits de-trapping of any charges unintentionally trapped within a memory cell of the memory block as a result of the first programming stage.

In addition, the first programming stage may comprise programming at least one programmable state of the memory block according to a first step size, and the second programming stage may comprise programming the at least one programmable state of the memory block according to a second step size, wherein a magnitude of the first step size is greater than a magnitude of the second step size.

Additionally, the first programming stage may be applied to a first word line of the memory block according to a programming order, and the second programming stage may be applied to a word line positioned just prior to the first word line according to the programming order.

Further, the time delay may also be applied after the second programming stage of the programming algorithm.

Furthermore, the time delay may be applied only to a specific portion of the memory block.

Also, the pre-determined amount of time may be further based upon or determined according to a desired decrease in a measured error bit rate count of the programming operation.

Further, the pre-determined amount of time may be in the range of 100 microseconds (μs) and five minutes.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope, the disclosure is described and explained with added specificity and detail through the use of the accompanying drawings in which:

FIG. 1 is a block diagram of a memory system, in accordance with exemplary embodiments;

FIG. 2 is a schematic depiction of a non-volatile memory cell, in accordance with exemplary embodiments;

FIG. 3 depicts the relationship between a source-drain current ID and a control gate voltage $V_{CG}$ for four different charges Q1-Q4 that a floating gate of a non-volatile memory cell may be selectively storing at any one time and at a fixed drain voltage, in accordance with exemplary embodiments;

FIG. 4A schematically depicts a series of NAND-type memory cells that are organized into a string, in accordance with exemplary embodiments;

FIG. 4B schematically depicts an array of memory cells, comprising a plurality of NAND-type strings, such as the type depicted in FIG. 4A, in accordance with exemplary embodiments;

FIG. 5 depicts a page of memory cells being sensed or programmed in parallel, and in relation to a memory array organized in the NAND-type configuration, in accordance with exemplary embodiments;

FIGS. 6A-6C depict stages of programming four states of a population of MLC NAND-type memory cells, in accordance with exemplary embodiments;

FIGS. 7A-7C depict stages of programming eight states of a population of TLC NAND-type memory cells, in accordance with exemplary embodiments;

FIGS. 8A-8C depict stages of programming 16 states of a population of QLC NAND-type memory cells, in accordance with exemplary embodiments;

FIG. 9 depicts a vertical NAND-type string in accordance with an exemplary embodiment;

FIG. 10 is a perspective view of a representative subsection of a monolithic three-dimensional NAND-type memory array, in accordance with exemplary embodiments;

FIG. 11 schematically depicts a configuration of a non-volatile memory array that is accessible by read/write circuits via row and column decoders, in accordance with exemplary embodiments;

FIG. 12 is a block diagram of an individual read/write module, in accordance with an exemplary embodiment;

FIG. 13A schematically depicts a memory device with a bank of partitioned read/write stacks, in accordance with exemplary embodiments;

FIG. 13B schematically depicts the memory device of FIG. 13A in a slightly different configuration, in accordance with exemplary embodiments;

FIG. 14 schematically depicts various components of a read/write stack, such as the read/write stacks depicted in FIG. 13A, in accordance with exemplary embodiments;

FIG. 15A schematically depicts a plurality of read/write stacks arranged amongst read/write circuits of a memory device, such as the memory device depicted in FIG. 13A, in accordance with exemplary embodiments;

DETAILED DESCRIPTION

Figure 15B:
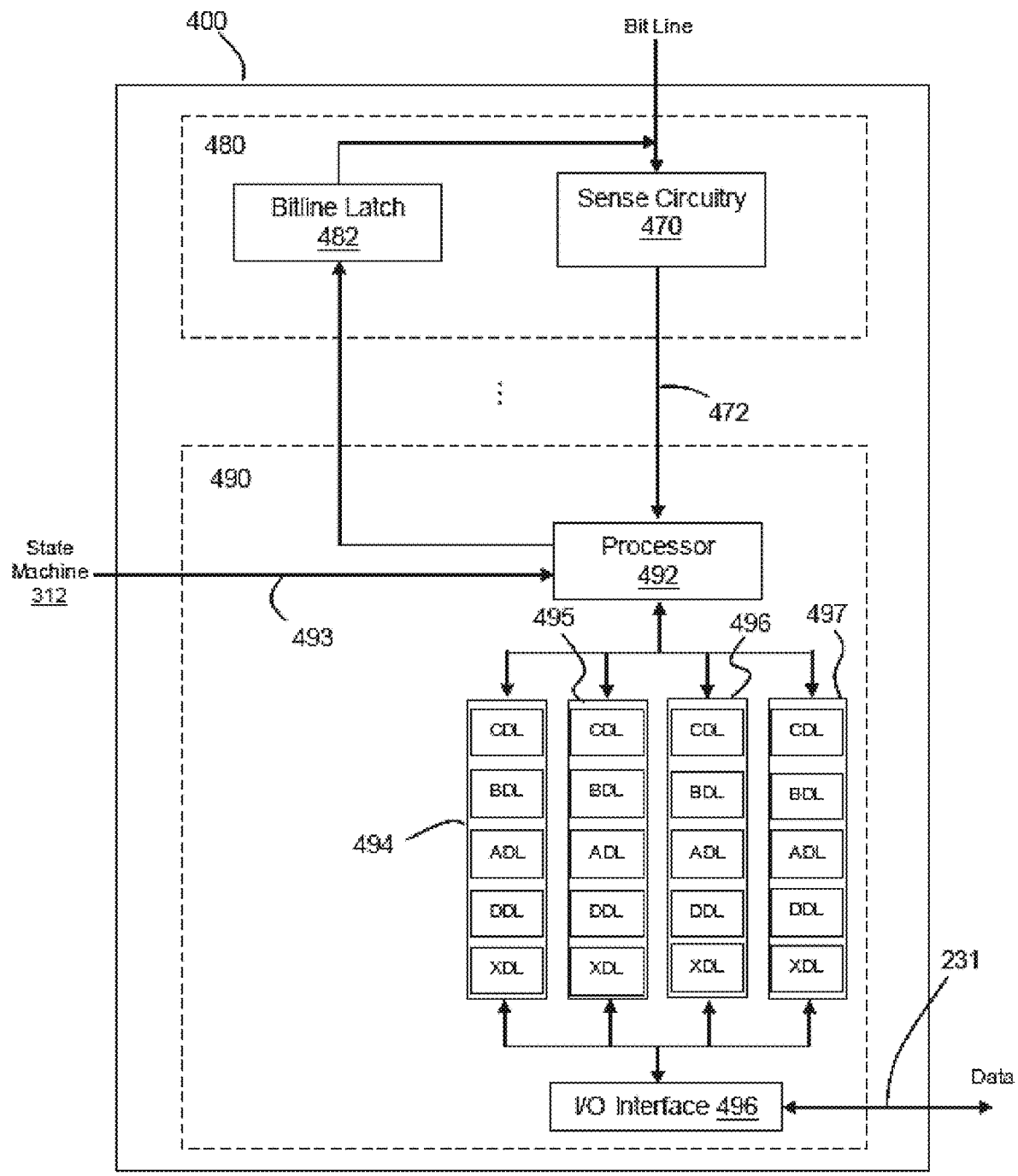
FIG. 15B is a block diagram depicting a sense block of a read/write stack, such as the read/write stacks depicted in FIG. 13A, in accordance with exemplary embodiments.

The following description is directed to various exemplary embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the detailed explanation of any specific embodiment is meant only to be exemplary of that embodiment and is not intended to suggest that the scope of the disclosure, including the claims, is limited to that particular embodiment.

The several aspects of the present disclosure may be embodied in the form of an apparatus, system, method, or computer program process. Therefore, aspects of the present disclosure may be entirely in the form of a hardware embodiment or a software embodiment (including but not limited to firmware, resident software, micro-code, or the like), or may be a combination of both hardware and software components that may generally be referred to collectively as a "circuit," "module," "apparatus," or "system." Further, various aspects of the present disclosure may be in the form of a computer program process that is embodied, for example, in one or more non-transitory computer-readable storage media storing computer-readable and/or executable program code.

Additionally, various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that comprises customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it comprises one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Thus, methods and means for these functions are described herein. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Further, the terms "program," "software," "software application," and the like as used herein, refer to a sequence of instructions designed for execution on a computer-implemented system. Accordingly, a "program," "software," "application," "computer program," or "software application" may include a subroutine, a function, a procedure, an object method, an object implementation, an executable application, an applet, a servlet, a source code, an object code, a shared library/dynamic load library and/or other sequence of specific instructions designed for execution on a computer system.

Additionally, the terms "couple," "coupled," or "couples," where used herein, are intended to mean either a direct or an indirect connection. Thus, if a first device couples, or is coupled to, a second device, that connection may be by way of a direct connection or through an indirect connection via other devices (or components) and connections.

Regarding the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that comprises the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or mores," "ones or more," and/or "ones or mores" according to set theory, unless expressly specified otherwise.

Various elements of the present disclosure are described below with reference to schematic flowchart diagrams and/or schematic block diagrams depicting methods, apparatuses, systems, and computer program processes according to exemplary embodiments of the present disclosure, wherein each block, or combinations of blocks, of the schematic flowchart and/or schematic block diagrams, can be implemented by specifically-written computer program instructions. As is understood in the art, the computer program instructions are executed by a designated processor of a computer or other programmable data processing apparatus, thereby creating the mechanisms for implementing the functions, acts, and/or operations specifically set forth in the one or more blocks of the schematic flowchart and/or schematic block diagrams. Further, it is noted that, in certain alternative process implementations, the functions specified in a block may occur out of the precise order depicted in the schematic flowchart and/or block diagrams. For example, two blocks depicted in the diagram as occurring in succession may, in fact, be executed substantially at the same time (i.e., concurrently), or even executed in a reverse order, depending upon the functionality involved. In addition, other process steps and methods that are equivalent in function, logic, or effect to one or more blocks, or portions thereof, of the diagrams may be conceived and are contemplated as being within the scope of the present disclosure. Furthermore, although the schematic diagrams may depict various arrow types and directions and line types as a matter of illustration, they are not intended to limit the scope of corresponding embodiments. For instance, an arrow may represent or signify a waiting or monitoring period of unspecified duration between enumerated steps of the depicted exemplary embodiment.

In the detailed description that follows, reference is made to the appended drawings, which form a part thereof. It is recognized that the foregoing summary is illustrative only and is not intended to be limiting in any manner. In addition to the illustrative aspects, example embodiments, and features described above, additional aspects, exemplary embodiments, and features will become apparent by reference to the drawings and the detailed description below. The description of elements in each figure may refer to elements of proceeding figures. Like reference numerals may refer to like elements in the figures, including alternate exemplary embodiments of like elements.

Referring now to the drawings in detail and beginning with FIG. 1, there is depicted an exemplary embodiment of a memory system 90 and is an illustration of its main hardware components. In this particular embodiment, the memory system 90 operates and is in communication with a host device 80 through a host interface. Further, the memory system 90 comprises a memory device 102 whose operations are controlled by a controller 100. The host device 80 may comprise any device or system that utilizes the memory system 90 (e.g., a computing device). Accordingly, the memory system 90 may be in the form of a removable memory card or an embedded memory system. For example, the memory system 90 may be embedded in a solid-state drive that is installed in a laptop computer. In another example, the memory system 90 may be embedded within the host device 80 such that the host 80 and the memory system 90 (including controller 100) are formed on a single integrated circuit chip. In embodiments in which the memory system 90 is implemented within a memory card, the host device 80 may include a built-in receptacle for the one or more types of memory cards or flash drives (e.g., a universal serial bus (USB) port, or a memory card slot). Further, the host 80 may use adapters in which a memory card is plugged.

Still referring to FIG. 1, as described in detail below, the memory device 102 may comprise one or more memory arrays of a plurality of non-volatile memory cells that are distributed over one or more integrated circuit chips. And, in accordance with this particular embodiment, the controller 100 may include several components that may include, but are not limited to, interface circuits 110, a processor 120, ROM (read-only memory) 122, RAM (random access memory) 130, programmable non-volatile memory 124, and additional components. The controller 100 may, for example, be in the form of one or more application-specific integrated circuits (ASIC) in which the components included in such an ASIC generally depend on the particular application.

With respect to the memory device 102 itself, FIG. 2 is a schematic depiction of an individual non-volatile memory cell 10 in accordance with an exemplary embodiment. As is mentioned above, the memory cell 10 may be implemented by a field-effect transistor having a charge storage unit 20, such as a floating gate or a dielectric layer. In addition, the memory cell 10 comprises a source region 14 and a drain region 16. Further, a control gate 30 is positioned above the floating gate 20. Example types of non-volatile memory cells having this general structure include, but are not limited to, electrically erasable programmable read-only memory (EEPROM) and flash EEPROM, NAND (NOT-AND)-type cells, and memory devices utilizing dielectric storage elements (e.g., NROM™). In operation, the memory state of a cell (e.g., programmed or erased) may, in accordance with certain embodiments, be read by sensing the conduction current across the source and drain electrodes of the memory cell when a reference voltage is applied to the control gate 30. More specifically, for each given charge on the floating gate 20 of a memory cell, a corresponding conduction current with respect to a fixed reference control gate voltage may be detected. Accordingly, as is described above, the range of charges programmable onto the floating gate defines a corresponding threshold voltage window or a corresponding conduction current window of the memory cell 10. Alternatively, rather than detecting the conduction current among a partitioned current window, it is possible to set the threshold voltage for a given memory state under test at the control gate 30 and detect if the resulting conduction current is higher than or lower than a threshold current (i.e., a cell-read reference current). In one such exemplary implementation, detection of the conduction current relative to a threshold current is accomplished by examining a discharge rate of the conduction current through the capacitance of the bit line.

FIG. 3 provides a graphical illustration of the correlation between the source-drain current ID and control gate voltage $V_{CG}$ for, for example, a non-volatile memory cell 10 having four different charge states Q1-Q4 that the floating gate may be selectively storing at any given time. As shown, with a fixed drain voltage bias, there exists four solid ID versus $V_{CG}$ curves representing four charge levels that can be programmed on a floating gate of the memory cell, wherein the four charge levels respectively correspond to four of eight possible memory states. Therefore, as an example, the threshold voltage window of a population of memory cells may range from 0.5 V to 3.5 V. In such an example, seven programmed memory states assigned as "0," "1," "2," "3," "4," "5," "6," respectively, and one erased state (which is not shown in FIG. 3), may be demarcated by partitioning the threshold window into regions at intervals of 0.5 V each. Accordingly, if a reference current, $I_{REF}$, of 2 µA is used as shown, then a cell programmed with Q1 voltage may be considered to be in a memory state "1" as its curve intersects with $I_{REF}$ in the region of the threshold window that is demarcated by the voltage range $V_{CG}$=0.5 V and 1.0 V. Similarly, Q4 is in a memory state "5."

Thus, as mentioned above, the more states that a memory cell 10 is made to store, the more finely divided is its threshold voltage window. For example, in a memory cell 10 that has a threshold voltage window ranging from −1.5 V to 5 V, thereby providing a possible maximum width of 6.5 V, and is to store 16 memory states, each state may only occupy a voltage range of from 200 mV to 300 mV. Such a narrow voltage range will require higher precision in programming and reading operations in order to achieve the required resolution.

Individual memory cells 10 are organized into strings in which the memory cells are placed in series. For example, depicted in FIG. 4A is an exemplary embodiment of a string 50 comprising NAND-type memory cells in which the series of the cells' respective transistor elements M1, M2, . . . , Mn (wherein "n" may equal 4, 8, 16 or higher) are daisy-chained with respect to their sources and drains. Further, as discussed with respect to FIG. 3, each memory transistor 10 in the string 50 has a charge storage element 20 (e.g., a floating gate) for storing a certain amount of charge so as to represent an intended memory state of that cell. And, as explained in greater detail below, each memory transistor 10 comprises a control gate 30 that allows control over the read and write operations. Present at the source terminal 54 and drain terminal 56 of the string 50 are select transistors S1, S2 that control the transistor elements' connection to the outlying memory array. Specifically, when the source select transistor S1 is turned on, the source terminal 54 is coupled to a source line. Likewise, when the drain select transistor S2 is turned on, the drain terminal 56 is coupled to a bit line of the memory array.

Expanding outward a hierarchical level, FIG. 4B is a schematic diagram depicting an exemplary embodiment of a memory array 210 comprised of a plurality of NAND strings 50 of the type illustrated in FIG. 4A. Along each column of NAND strings 50, a bit line 36 is coupled to the drain terminal 56 of each NAND string. In addition, along each bank of NAND strings 50, a source line 34 is coupled to the source terminals 54 of each NAND string. Further, the control gates 30 of the memory transistors 10 in a row of memory cells in the bank of NAND strings 50 are connected to the same word line 42. Accordingly, when an addressed memory transistor 10 within a NAND string 50 is read or verified during a programming operation, an appropriate voltage is applied to its control gate 30. Concurrently, the remaining non-addressed memory transistors 10 within the NAND string 50 are fully turned on by applying a sufficient voltage to their respective control gates 30. As a result, a conductive pathway is created from the source of the addressed memory transistor 10 to the source terminal 54 of NAND string 50, and from the drain of the addressed memory transistor 10 to the drain terminal 56 of the cell.

Further, the control gates 32 of the select transistors S1, S2 of each NAND string 50 in the memory array 210 provides control access to the NAND string at its source terminal 54 and drain terminal 56. The control gates 32 of the select transistors S1, S2 along a row in a bank of NAND strings 50 are connected to the same select line 44. Thus, an entire row of memory cells 10 in a bank of NAND strings 50 can be addressed by applying the appropriate voltages on the word lines 42 and select lines 44 of the bank of NAND strings 50.

Turning now to FIG. 5, there is depicted a detailed illustration of one bank of NAND strings 50 of a memory array 210 according to an exemplary embodiment thereof. This view is particularly useful in visualizing a row-by-row configuration of the memory array 210, wherein each row of the array 210 may be referred to as a "page." Accordingly, a physical page (such as page 60 denoted in FIG. 5) is a group of memory cells 10 that is enabled to be sensed or programmed in parallel. In fact, a page is the smallest unit of the memory device that may be programmed or written to. Programming of a page is accomplished by a corresponding page of sense amplifiers 212, wherein each sense amplifier may be coupled to a respective NAND string 50 via a bit line (e.g., see respective bit lines BL0, BL1, BL2, BL3, BL4, BL5, . . . , BLm−1, and BLm illustrated in FIG. 5). Thus, a page 60 is enabled by the control gates of the plurality of memory cells 10 in page 60, which are connected to a common word line 42, and each memory cell 10 of the page 60 is accessible by a sense amplifier via a bit line 36. Therefore, when programming or sensing a page 60 of memory cells 10, a programming or sensing voltage is respectively applied to the common word line (e.g., word line WL3 with respect to the page 60) together with appropriate voltages on the bit lines.

Regarding the manner in which data is programmed and erased, it is important to note that, with respect to flash memory, a memory cell must be programmed from an erased state. In other words, a floating gate 20 must first be emptied of charge, thereby placing the memory cell in an erased state, before a programming operation can subsequently add a desired amount of charge back to the floating gate 20. Thus, the level of charge on a floating gate 20 cannot be incrementally increased or decreased from its previous programmed level. Therefore, it is not possible for update data to overwrite the existing data of a memory cell 10. Rather, the update data must be programmed to a previous unwritten location.

For purposes of promoting performance in erase operations, an array 210 of memory cells 10 is, for example, divided into a large number of blocks of memory cells, wherein a block is the smallest unit of the memory device in which the memory cells contained may be erased together. Furthermore, each block of memory cells 10 may be divided into a number of physical pages 60 wherein, as mentioned above, a programming operation is conducted page by page. Accordingly, a logical page is a unit of programming or reading that contains a number of bits equal to the number of memory cells 10 in a given physical page. For example, in a memory device of the SLC-type in which one bit of data is stored in each memory cell 10, one physical page 60 stores one logical page of data. Accordingly, in a memory device of the MLC-type in which two bits of data are stored in each memory cell 10, one physical page 60 can store two logical pages of data. As such, one or more logical pages of data are typically stored in one row (i.e., page 60) of memory cells. A page 60 can store one or more sectors wherein a sector is comprised of both user data and overhead data. In an exemplary embodiment, individual pages 60 may be divided into segments in which each segment contains the fewest number of memory cells 10 that may be written at one time in a basic programming operation.

To illustrate an exemplary embodiment of the programming stages of a MLC-type memory device comprising a population of four-state memory cells, reference is made to FIGS. 6A-6C. In FIG. 6A, there is depicted a population of memory cells in which the characteristic threshold voltage window is divided into four distinct voltage distributions wherein each distribution corresponds to a programmable memory state (i.e., memory states "0," "1," "2," and "3"). FIG. 6B illustrates an initial distribution of "erased" threshold voltages for an erased memory. In FIG. 6C, much of the memory cell population is programmed such that the initial "erased" threshold voltage of a given memory cell 10 is moved to a higher value into one of the three divided voltage zones demarcated by verify levels $vV_1$, $vV_2$, and $vV_3$. Accordingly, each memory cell can be programmed to one of the three programmable states "1," "2," and "3," or remain in the "erased" state. On a bit level, a 2-bit code having a lower bit and an upper bit can be used to represent each of the four memory states. For example, as depicted in FIG. 6C, the memory states "0," "1," "2," and "3" may be assigned bit values "11," "01," "00," and "10" respectively. In such an example, the 2-bit data may be read from the memory by sensing in a "full-sequence" mode where the two bits are sensed together by sensing relative to the corresponding read demarcation threshold voltages $rV_1$, $rV_2$, and $rV_3$ in three sub-passes respectively.

Similarly, FIGS. 7A-7C illustrate programming stages of a TLC-type memory device comprising a population of eight-state memory cells, each cell being programmable into eight distinct distributions of threshold voltages that, in accordance with this particular embodiment, represent memory states "0," "1," "2," "3," "4," "5," "6," and "7," respectively (as shown in FIG. 7A). Thus, FIG. 7B depicts an initial distribution of "erased" threshold voltages for an erased memory. Further, FIG. 7C depicts an example of the memory after many of the memory cells have been programmed. As a result, a cell's threshold voltage is moved higher into one of the distinct voltage ranges demarcated by levels $V_1$, $V_2$, $V_3$, $V_4$, $V_5$, $V_6$, and $V_7$. Accordingly, each memory cell can be programmed to one of the seven programmed states "1" through "7," or can remain unprogrammed in the "erased" state. As a consequence of the programming, the initial distribution of the "erased" state as shown in FIG. 7B becomes narrower as indicated by the "0" state in FIG. 7C. In this case, a 3-bit code having lower, middle, and upper bits can be used to represent each of the memory states (i.e., "111," "011," "001," "101," "100," "000," "010," and "110") and the 3-bit data may also be read from the memory by sensing in the "full-sequence" mode where the three bits are sensed together by sensing relative to the demarcation threshold values V1 through V7 in seven sub-passes respectively.

Continuing in a similar manner, FIGS. 8A-8C illustrate the programming stages of a QLC-type memory device comprising a population of 16-state memory cells, each cell being programmable into 16 distinct distributions of threshold voltages that, in accordance with this particular embodiment, represent memory states "0," "1," "2," "3," "4," "5," "6," "7," "8," "9," "10," "11," "12," "13," "14," and "15," respectively (as shown in FIG. 8A). Accordingly, FIG. 8B depicts an initial distribution of "erased" threshold voltages for an erased memory; whereas FIG. 8C depicts an example of the memory after programming. As depicted, a cell's threshold voltage is moved higher into one of the distinct voltage ranges, as demarcated by levels $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, and $V_{15}$. Therefore, each memory cell can be programmed to one of 15 programmed states "1" through "15," or can remain unprogrammed in the "erased" state. Again, as a consequence of the programming, the initial distribution of the "erased" state as shown in FIG. 8B becomes narrower as indicated by the "0" state in FIG. 8C. Thus, according to this particular distribution, a 4-bit code having lower, middle, upper and top bits can be used to represent each of the memory states (i.e., "1111," "1110," "1100," "1101," "0101," "0100," "0000," "0010," "0110," "0111," "0011," "0001," "1001," "1011," "1010," and "1000").

In FIGS. 4A-4B and 5 and the foregoing corresponding discussion, there is generally described a two-dimensional (or planar) memory array 210 (lying in a x-y plane, for example), which may comprise NAND-type memory cells. However, in an alternative configuration, a memory array may be in the form of a three-dimensional array that, unlike being formed on a planar surface of a semiconductor wafer, the array extends upwards from the wafer surface and comprises stacks or columns of memory cells extending vertically in an upwards direction (for example, in a z direction that is perpendicular to the x-y plane). For example, in FIG. 9 there is depicted an exemplary embodiment of a NAND-type string 701, which is operated in a similar manner as a planar two-dimensional NAND-type string (such as the NAND-type string 50 described above). In this configuration, a memory cell is formed at the juncture of a vertical bit line (see e.g., local bit line 703) and a word line (see e.g., word lines WL0, WL1, etc.), wherein a charge trapping layer located between the local bit line 703 and an intersecting word line stores charge (which dictates the threshold voltage of the transistor formed by the word line—gate—coupled to the vertical bit line—channel—that it encircles). To form such a vertical string 701, stacks of word lines are formed and memory holes are etched at the appropriate locations where cells are to be formed, wherein each memory hole is lined with a charge trapping layer and filled with a suitable local bit line/channel material. Dielectric layers are included for the necessary isolation. Further, located at either end of the NAND-type string 701 are select gates 705, 707, which allow for the selective connection to, or isolation from, external elements 709, 711 that include, for example, conductive lines such as common source lines or bit lines that serve large numbers of strings 701 of an array. In the particular embodiment shown in FIG. 9, the vertical NAND-type string 701 has 32 memory cells (i.e., at the juncture between local bit line 703 and word lines 0 through 31) connected in series. However, a NAND-type string 701 may comprise any suitable number of memory cells.

As described above, memory cells of the memory structure 200 may be arranged in a single memory device level in an ordered two-dimensional array of a plurality of rows and/or columns. Alternatively, a three-dimensional memory array may be arranged such that memory cells occupy multiple planes or multiple memory device levels, thereby forming a structure that has three dimensions (e.g., in the x, y, and z directions, wherein the z direction is substantially perpendicular and the x and y directions are substantially parallel to the major surface of the semiconductor substrate). In some exemplary embodiments, a three-dimensional memory structure 200 may be vertically arranged as a stack of multiple two-dimensional memory array device levels. In other exemplary embodiments, the three-dimensional memory structure 200 is arranged as multiple vertical columns (wherein each column extends substantially perpendicular to the major surface of the substrate, i.e., in the z direction) with each column having multiple memory cells.

In this example, the vertical columns may be arranged in a two-dimensional configuration (i.e., in the x-y plane), thereby forming a three-dimensional arrangement in which the memory cells are on multiple vertically stacked memory planes. Other configurations of memory elements in three dimensions can also constitute a three-dimensional memory array. However, generally speaking, a three-dimensional NAND array may be constructed by tilting a two-dimensional memory structure, such as structures 50 and 210 of FIGS. 4A-B and 5, respectively, in the vertical direction that is perpendicular to the x-y plane (i.e., the z direction), such that each y-z plane of the three-dimensional structure corresponds to the page structure of FIG. 5, wherein each plane is at differing locations along the x axis. As a result, the global bit lines (e.g., BL0, . . . , BLm, of FIG. 5) each run across the top of the memory structure to an associated sense amplifier (e.g., SA0, . . . , SAm). Accordingly, the word lines (e.g., WL0, . . . , WLn, of FIG. 5), and the source and select lines (e.g., SSL0, . . . , SSLn, and DSL0, . . . , DSLn, respectively) extend in the x direction, with the bottom of each NAND string (e.g., string 50) connected to a common source line.

Referring now to FIG. 10, there is depicted an oblique perspective view of an example subsection of an embodiment of a three-dimensional NAND memory array 600 of the Bit Cost Scalable ("BiCS") type in which one or more memory device levels is formed above a single substrate. The example subsection corresponds to two of the page structures shown in FIG. 4B wherein, depending upon the particular embodiment, each may correspond to a separate memory block or may be different extensions of the same block. According to this embodiment, rather than lying in the same y-z plane, the NAND strings are pressed in the y-direction such that the NAND strings have a staggered configuration in the x-direction. Further, at the top of the array 600, the NAND strings are connected along global bit lines (BL) that span multiple of these subsections of the array 600 that run in the x-direction. In addition, global common source lines (SL) also run across multiple subsections of the memory array 600 in the x-direction and are connected to the sources at the bottom of the NAND strings by a local interconnect (LI) that operates as the local common source line of the individual extension. However, dependent upon the embodiment, the global source lines (SL) can span the whole, or just a subsection, of the memory array 600. Depicted on the right side of FIG. 10 is a schematic representation of the fundamental elements of one of the vertical NAND strings 610 of the memory array 600. Similar to the NAND string 50 of FIG. 4A, the string 610 is comprised of a series of interconnected memory cells. The string 610 is connected to an associated bit line (BL) through a drain select gate (SGD). A source select gate (SDS) connects the string 610 to a global source line (SL) through an associated local source line (LI). Further included in this particular embodiment are several dummy cells located at the ends of the string 610. Due to their proximity to select gates (SGD, SDS) and, thereby, their susceptibility to disturbs, the dummy cells are not used to store user data.

Referring back to the overall architecture of a memory system that is, for example, depicted in FIG. 1, a schematic depiction of a typical arrangement of a memory array of such a system is illustrated in FIG. 11. In this exemplary embodiment, there is shown a non-volatile memory array 200 that is accessible by read/write circuits 170 by way of row decoder 140 and column decoder 160. As previously described above, individual memory cells of the memory array 200 are addressable via a set of selected word line(s)

and bit line(s). Accordingly, the row decoder 140 selects one or more word lines and the column decoder 160 selects one or more bit lines in order to apply the appropriate voltages to the respective gates of the addressed memory cells. Further, read/write circuits 170 are provided to read or write the memory states of the addressed memory cells, wherein the read/write circuits 170 comprise a number of read/write modules connectable via bit lines to the memory elements of the array 200. A schematic block diagram of such a read/write module 190 is provided in FIG. 12, according to an exemplary embodiment thereof. In operation, during a read or verify step, a sense amplifier 150 determines the current that is flowing through the drain of an addressed memory cell that is connected via a selected bit line. The level detected by the sense amplifier 150 is converted by a level-to-bits conversion logic to a set of data bits to be stored in a data latch 155. Now referring back to FIG. 11, the read/write circuits 170 are organized into banks of read/write stacks 180 wherein each read/write stack 180 is a stack of read/write modules 190.

Referring now to FIG. 13A, there is shown an exemplary embodiment of a memory device (such as memory device 102 in FIG. 1, for example) that is comprised of a non-volatile memory array 300 (which may include the NAND-type SLC, MLC, TLC, and/or QLC memory cells that are in a two- or three-dimensional configuration), control circuitry 310, and read/write circuits 370. Further, as is depicted, read/write circuits 370 are comprised of one or more banks of partitioned read/write stacks 400, thereby allowing a block (or "page") of memory cells to be read or programmed in parallel wherein, according to an exemplary embodiment, a "page" of memory cells constitutes a contiguous row of memory cells. Memory array 300 is addressable by word lines via row decoder 330 and by bit lines via column decoder 360. Alternatively, the memory array 300 may comprise rows of memory cells partitioned into multiple blocks or pages. Hence, in such an exemplary embodiment, a block multiplexer 350 is provided to multiplex the read/write circuits 370 to the individual blocks.

With respect to the control circuitry 310, it operates in conjunction with the read/write circuits 370 to perform memory operations on the memory array 300. In this particular embodiment, the control circuitry 310 includes a state machine 312, an on-chip address decoder 314, and a power controller 316. The state machine 312 provides chip level control of memory operations. The on-chip decoder 314 provides an address interface between that that is used by the host or a memory controller to the hardware address used by the decoders 330, 360. Lastly, the power controller 316 controls the power and voltages that are supplied to the word lines and bit lines during memory operations.

FIG. 13B depicts a slightly different exemplary embodiment of the memory device of FIG. 13A. In this particular embodiment, access to memory array 300 by the various peripheral circuits is implemented in a symmetrical manner on opposite sides of the memory array 300. As a result, the access lines and circuitry on each side of the memory array 300 are reduced in half when compared to the configuration in FIG. 13A. Specifically, the row decoder 330 is split into multiple row decoders 330A, 330B, and the column decoder 360 is split into multiple column decoders 360A, 360B. Furthermore, in such an embodiment in which a row of memory cells is partitioned into multiple blocks, block multiplexer 350 is split into multiple block multiplexers 350A, 350B. The read/write circuits 370 are likewise divided into read/write circuits 370A (connecting to bit lines from the bottom of memory array 300) and read/write circuits 370B (connecting to bit lines from the top of memory array 300). Accordingly, the density of the read/write modules (as well as the partitioned read/write stacks 400) is, in essence, reduced by half.

Referring now to FIG. 14, there is illustrated an exemplary embodiment of certain components in a read/write stack, such as the read/write stacks 400 of FIG. 13A. According to this particular architecture, a read/write stack 400 comprises a stack of sense amplifiers 212 for sensing a "k" number of bit lines, an I/O module 440 for input or output of data over an I/O bus 231, a stack of data latches 430 for storing input and/or output data, a common processor 500 to process and store data among the read/write stack 400, and a stack bus 421 for communication among the read/write stack 400 components. In addition, a stack bus controller provides control and timing signals via lines 411 for controlling the various components of read/write stack 400. FIG. 15A depicts an exemplary embodiment for incorporating the read/write stack 400 of the embodiment of FIG. 14 amongst the read/write circuits 370 of the memory devices depicted in FIGS. 13A-13B. As indicated above, each of read/write stacks 400 operates on a group of "k" number bit lines in parallel. Therefore, if a page in memory array 300 has p=r*k bit lines, there will be a "r" number of read/write stacks—i.e., read/write stacks 400-1, . . . , 400-r. Accordingly, the entire bank of partitioned read/write stacks 400-1, . . . , 400-r, operating in parallel allows a block (or a page) of p cells along a row to be read or programmed in parallel, there being p read/write modules for the entire row of cells. As each read/write stack 400-1, . . . , 400-r serves "k" memory cells, the total number of read/write stacks in a bank may be expressed as r=p/k. Further, in accordance with this example, each read/write stack correspondingly has a stack of sense amplifiers 212-1, . . . , 212-k that serves a segment of "k" memory cells in parallel. In addition, each read/write stack correspondingly has a stack of data latches 430-1, . . . , 430-k, wherein each data latch is associated with a memory cell. As such, there is an I/O module 440 enabling data latches 430-1, . . . , 430-k to exchange data externally via an I/O bus 231.

Still referring to FIG. 15A, there is also shown a stack bus controller 410 that receives signals from the memory controller 310 (via lines 311) and in turn provides control and timing signals to the read/write circuits 370 via lines 411. Communication among the read/write stacks 400 is implemented by an interconnecting stack bus controlled by stack bus controller 410. Therefore, the control lines 411 provide control and clock signals from the stack bus controller 410 to the components of the read/write stacks 400-1, . . . , 400-r. In this particular example, the interconnecting stack bus is divided into a SABus 422 and a DBus 423, wherein SABus 422 provides for communication between the common processor 500 and the stack sense amplifiers 212-1, . . . , 212-k, and the DBus 423 provides a communication pathway between the common processor 500 and the stack of data latches 430-1, . . . , 430-k. With respect to the common processor 500, it further comprises an output 507 for output of a status signal of a memory operation, such as an error condition. As is depicted in FIG. 15A, this status signal may, for example, be used to drive a gate of a n-transistor 550 that is tied to a Flag Bus 509 in a Wired-Or configuration, wherein the Flag Bus 509 is pre-charged by the controller 310 and is pulled down when a status signal is asserted by any of read/write stacks 400-1, . . . , 400-r.

Further, an exemplary embodiment of an individual sense block (as encompassed by a read/write stack 400) is depicted in FIG. 15B. Sense block 400 is partitioned into one or more core portions comprising the sense modules 480 or sense amplifiers, and a common portion, referred to as a managing circuit 490. In one embodiment, there is a separate sense module 480 for each bit line and one common managing circuit 490 for a set of multiple, e.g., four or eight, sense modules 480. Each of the sense modules in a group communicates with the associated managing circuit via data bus 472. Thus, there are one or more managing circuits which communicate with the sense modules of a set of storage elements 10.

Sense module 480 comprises sense circuitry 470 that performs sensing by determining whether a conduction current in a connected bit line is above or below a predetermined threshold level. Sense module 480 also includes a bit line latch 482 that is used to set a voltage condition on the connected bit line. For example, a predetermined state latched in bit line latch 482 will result in the connected bit line being pulled to a state designating program inhibit (e.g., 1.5-3 V). As an example, a flag=0 can inhibit programming, while flag=1 does not inhibit programming.

In the exemplary embodiment of FIG. 15B, the managing circuit 490 comprises a processor 492, four example sets of data latches 494, 495, 496, and 497, and an I/O interface 496 coupled between the sets of data latches 494-497 and the data bus 231. One set of data latches may be provided for each sense module 480, and data latches identified by XDL, DDL, ADL, BDL, and CDL may be provided for each set. In some cases, additional data latches may be used. In one exemplary approach, in a memory device which uses eight data states, XDL stores user data, DDL stores an indication of whether quick pass write programming is used, ADL stores a lower page of data, BDL stores a middle page of data, and CDL stores an upper page of data.

Processor 492 performs computations, such as to determine the data stored in the sensed storage element and store the determined data in the set of data latches. Each set of data latches 494-497 is used to store data bits that are determined by processor 492 during a read operation, and to store data bits imported from the data bus 231 during a programming operation which represent write data that is meant to be programmed into the memory. The I/O interface 496 provides an interface between data latches 494-497 and the data bus 231.

During reading, the operation of the system is under the control of state machine 312 that controls the supply of different control gate voltages to the addressed storage element 10. As it steps through the various predefined control gate voltages corresponding to the various memory states supported by the memory, the sense module 480 may trip at one of these voltages and a corresponding output will be provided from sense module 480 to processor 492 via bus 472. At that point, processor 492 determines the resultant memory state by consideration of the tripping event(s) of the sense module and the information about the applied control gate voltage from the state machine via input lines 493. It then computes a binary encoding for the memory state and stores the resultant data bits into data latches 494-497. In another embodiment of the managing circuit 490, the bit line latch 482 operates in a double duty capacity, both as a latch for latching the output of the sense module 480 and also as a bit line latch as described above.

During program or verify operations, the data to be programmed (write data) is stored in the set of data latches 494-497 from the data bus 231. The programming operation, under the control of the state machine 312, comprises a series of programming voltage pulses applied to the control gates of the addressed storage elements. Each program pulse is followed by a read back (verify) to determine if the storage element has been programmed to the desired memory state. In some cases, processor 492 monitors the read back memory state relative to the desired memory state. When the two are in agreement, the processor 492 proceeds to set the bit line latch 482 to cause the bit line to be pulled to a state designating program inhibit. This inhibits the storage element coupled to the bit line from further programming even if program pulses appear on its control gate. In other embodiments, the processor initially loads the bit line latch 482 and the sense circuitry sets it to an inhibit value during the verify process.

As mentioned, each set of data latches 494-497 may be implemented as a stack of data latches for each sense module. In one exemplary embodiment, there are three data latches per sense module 480. In some implementations, data latches are implemented according to a shift register so that the parallel data that is stored therein is converted to serial data for data bus 231, and vice versa. For example, all data latches corresponding to the read/write block of M storage elements can be linked together to form a block shift register so that a block of data can be input or output by serial transfer. In particular, the bank of read/write modules may be adapted in order that each of its set of data latches will shift data into or out of the data bus in sequence as if they are part of a shift register for the entire read/write block.

The data latches identify when an associated storage element 10 has reached certain mileposts in a programming operation. For example, latches may identify if a storage element's $V_{th}$ is below a particular verify level. Data latches indicate whether a storage element currently stores one or more bits from a page of data. For example, with respect to one exemplary embodiment, the ADL latch is flipped (e.g., from 0 to 1) when a lower page bit is stored in an associated storage element. Further, the BDL latch is flipped when a middle page bit is stored in an associated storage element. And the CDL latch is flipped when an upper page bit is stored in an associated storage element. A bit is stored in a storage element when the $V_{th}$ exceeds an associated verify level.

Figure 16:
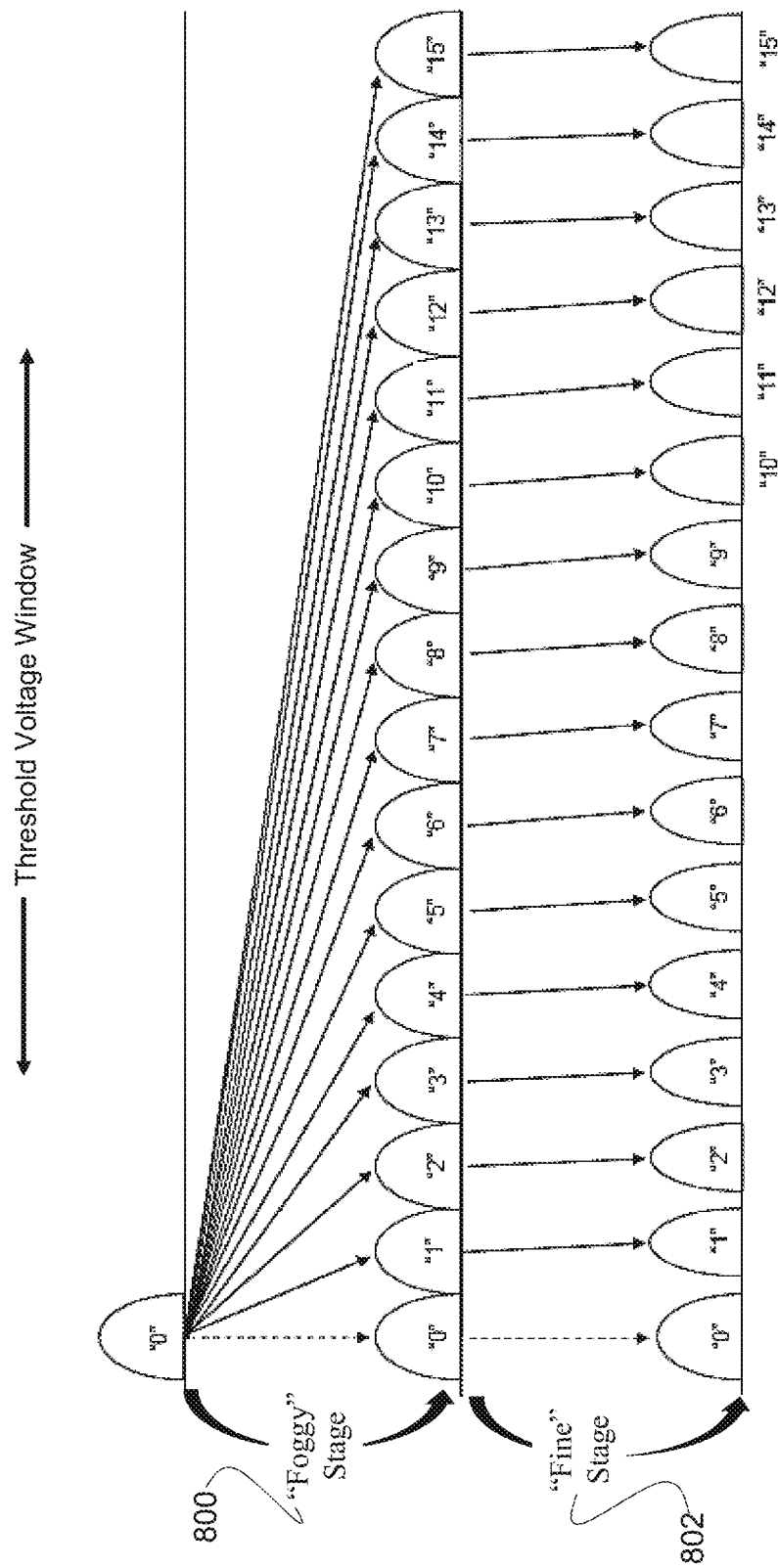
FIG. 16 depicts a two-stage "foggy-fine" programming approach of 16 states of a population of QLC NAND-type memory cells, in accordance with exemplary embodiments.

As mentioned above, these high storage density memory structures, such as the BiCS type described, for example, with respect to the exemplary embodiment shown in FIG. 10, have relatively small spacing between adjacent memory cells and each cell has a relatively small tolerance between discrete voltage ranges for memory functions. Accordingly, improving the amount of efficient storage capability within a fixed die size has competing drawbacks and liabilities. Therefore, various approaches and corrective and compensatory measures may be employed to improve the accuracy, reliability, and efficiency of the memory operations. Such measures aim, for example, at minimizing the interference between, for example, neighboring word lines (WL), and at fortifying short-term data retention with respect to scalable memory structures. For example, FIG. 16 illustrates an exemplary embodiment of a two-stage programming approach applied to, in this particular case, a population of QLC-type NAND memory cells, wherein an objective is to effectively "fine-tune" the resulting threshold voltage distributions ($V_{th}$) of the 16 programmable states (i.e., states "0" through "15" in FIG. 16). According to this specific algorithmic approach, the programming occurs in two consecutive stages, 800 and 802. In a first stage 800 (which may be referred to as the "foggy" stage), all 16 states are programmed according to a given step size. As depicted in FIG. 16, the respective threshold voltage distribution ($V_{th}$) of each of the 16 states is relatively wide such that the delineation, or gap, between the voltage distributions ($V_{th}$) of each of the 16 states is nearly nonexistent. Therefore, to tighten the voltage distributions ($V_{th}$) of the 16 states, a second programming stage 802 (which may be referred to as the "fine" stage) is subsequently applied. Specifically, in stage 802, each of the 16 states are once again programmed, but according to a slightly shorter step size than the given step size used in the first stage 800. As a result of this second stage 802, a discernible buffer, or gap, between the voltage distributions ($V_{th}$) of each of the 16 states is ideally obtained, as is depicted in FIG. 16.

Figure 17:
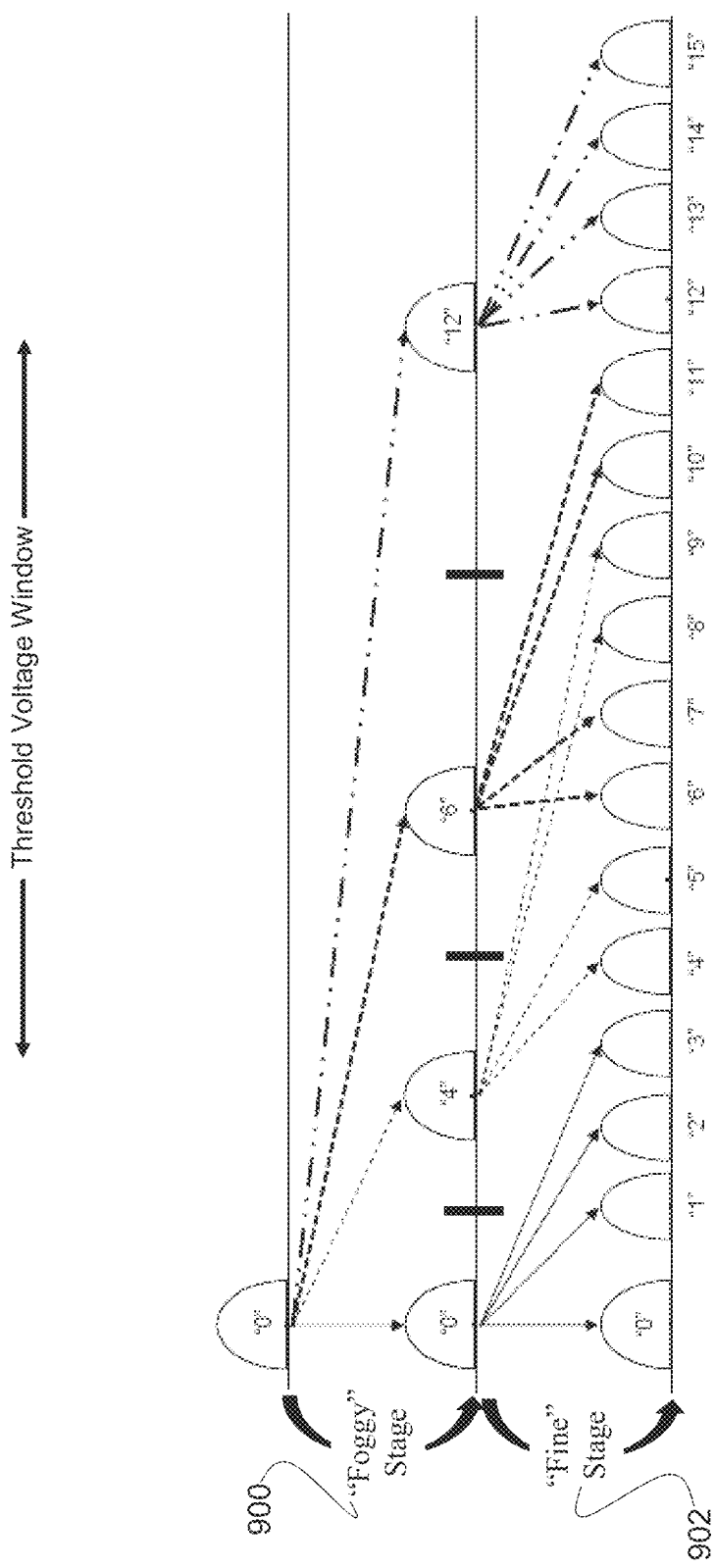
FIG. 17 depicts a two-stage programming approach with respect to 16 states of a population of QLC NAND-type memory cells, in accordance with exemplary embodiments.

However, such a two-stage programming technique requires that all of the four pages of data programmed during the first stage 800 be temporarily stored in a cache or buffer (by, for example, employing multiple data latches as described above) until the second stage 802 is complete. Referring now to FIG. 17, there is shown an exemplary embodiment of a two-stage programming methodology for programming the 16 programmable states of a population of QLC NAND-type memory cells of a memory structure that does not require intermediate storage of unusable ("foggy") data.

It should be noted that although the following description specifies a QLC memory structure, this is intended to be non-limiting and only for purposes of illustration. As discussed below, the methodology depicted in FIG. 17 may be applicable to NAND-type memory cells having other storage density configurations (i.e., those storing less than or more than four pages of data) depending upon the parameters of that memory structure. Similar to the embodiment of a two-stage programming ("foggy-fine") algorithm that is depicted in FIG. 16, the programming approach of FIG. 17 is also comprised of two consecutive stages. However, in stark contrast to the embodiment of FIG. 16, all 16 states are not programmed during a first stage 900 of the programming approach of FIG. 17. Rather, in the first stage 900, only two of the four pages of data are programmed with respect to MLC NAND-type memory cells. Accordingly, only four states are programmed in this first stage 900. As shown in FIG. 17, according to this particular embodiment, program states "0," "4," "6," and "12" are programmed in the first stage 900. However, this example is not intended to be limiting and this programming approach may be modified to select a different combination of four of the 16 states depending upon the desired threshold voltage distributions of the states and the allowance, or gap, between the voltage distributions of the four selected states. Beneficially, by utilizing MLC NAND-type cells and, thereby, programming only four states in this first stage 900, the respective threshold voltage distributions of the states provide a discernible gap therebetween when compared to the nearly nonexistent buffer between the voltage distributions of the 16 states of the first stage 800 of the programming approach of FIG. 16. As a result, the precision or resolution of the data being programmed during this first stage 900 thereby allows for the data to be accurately read and directly used in a second (i.e., "fine") programming stage 902 of the exemplary embodiment of FIG. 17, in which the entirety of the four page data is programmed with respect to 16 states. Accordingly, unlike the first stage 800 of the embodiment of FIG. 16, first stage 900 does not warrant a cache or buffer storage for data that is ultimately unusable. Rather, the two page data that is written during the first stage 900 may be read back from the MLC NAND-type memory cells using "IDL-Read" (i.e., Internal Data Load) of the memory structure.

After completion of the first stage 900, the two pages of data programmed therein is combined with the two pages of user data that is not yet programmed and, thereafter, written to a population of QLC NAND-type memory cells in a second programming stage 902. Depicted in FIG. 17 is one possible programming algorithm for programming all 16 states according to the specific four bit values (i.e., lower data, middle data, upper data, and top data). However, this is just one example and the 16 states of the memory cell population may be programmed according to a multitude of different verify/read levels and series of four bit value representations.

Further, referring back to the "foggy-fine" programming algorithm that is discussed above with respect to FIG. 16, the steps of such a programming algorithm may be applied in various programming orders. For example, according to some embodiments, a "foggy" stage is applied to an entire block during a programming operation and, after the "foggy" stage is completed with respect to the entire block, only then does the programming operation begin to apply a "fine" stage to the entire block. In another example, according to certain embodiments, the two stages of the "foggy-fine" programming algorithm are applied or are directed in an alternating order with respect to a smaller section of a memory block. For example, in some embodiments, a "foggy" stage may be applied to a first string of a memory block. Thereafter, a "fine" stage may be applied to the first string of the memory block before proceeding with programming a second string of the memory block. Still further, according to other exemplary embodiments, the two stages of a "foggy-fine" programming algorithm may be alternatingly applied on a word line level or a word line basis. For example, a "foggy" stage may be applied with respect to a first word line of a memory block. Thereafter, a "fine" stage is then applied to the first word line of the memory block before continuing the programming with respect to a second word line of the memory block.

Further, the two stages of a "foggy-fine" programming algorithm may be applied in a "leap-frog" order with respect to, for example, the multiple strings or multiple word lines of a memory block. The flow diagram set forth in FIG. 18 generally depicts a non-limiting example of such a "leap-frog" order in accordance with one exemplary embodiment. Beginning at step 1000, a system-level command is received to initiate a programming operation with respect to a given memory block according to, in this particular example, a "foggy-fine" programming algorithm (such as the algorithm that is depicted in FIG. 16). As a result of the command, the programming operation proceeds according to a pre-determined or pre-defined programming order. Accordingly, at step, 1002, the programming operation reaches the programming of a representative word line, i.e., "WLn," of a representative string, i.e., "String n," of the memory block, wherein the word line "WLn" and the "String n" can be any word line and string of the memory block. Accordingly, at step 1002, a "foggy" programming stage is applied to word line "WLn" of "String n" of the memory block. Next, at step 1004, a "fine" programming stage is applied to the word line that is positioned just prior to word line "WLn" of "String n" in the programming order, i.e., word line "WLn−1" of "String n", of the memory block. That is to say, before a "fine" programming stage is applied to any given word line, the "foggy" programming stage "leap-frogs" to the next word line in the programming order before returning back to the previous (given) word line to complete the "fine" programming stage. Therefore, as indicated at step 1006, a "foggy" programming stage is next applied to the word line that is positioned just after word line "WLn" of "String n" in the programming order, i.e., word line "WLn+1" of "String n", of the memory block. And, thereafter, at step 1008, the programming operation next returns to word line "WLn", to which a "fine" programming stage is applied. This "leap-frog" order between the application of the two stages, i.e., the "foggy" stage and the "fine" stage, continues until all strings of the memory block are programmed and, at that juncture, the programming operation is complete (see step 1010).

As mentioned above, a "foggy-fine" programming algorithm is especially beneficial in that it reduces the occurrence of, for example, neighboring word line interference (NWI). In addition thereto, the "leap-frog" order (such as the example depicted in FIG. 18) may further minimize the occurrence of neighboring word line interference (NWI). However, the application of this "foggy-fine" programming algorithm and, according to some observations, the use of a "leap-frog" programming order, may counterproductively introduce or generate other parasitic elements that impair the electrical behavior of the memory structure and, as a consequence, degrade the performance of the memory device. One such example is depicted in FIG. 19, in general terms.

Figure 18:
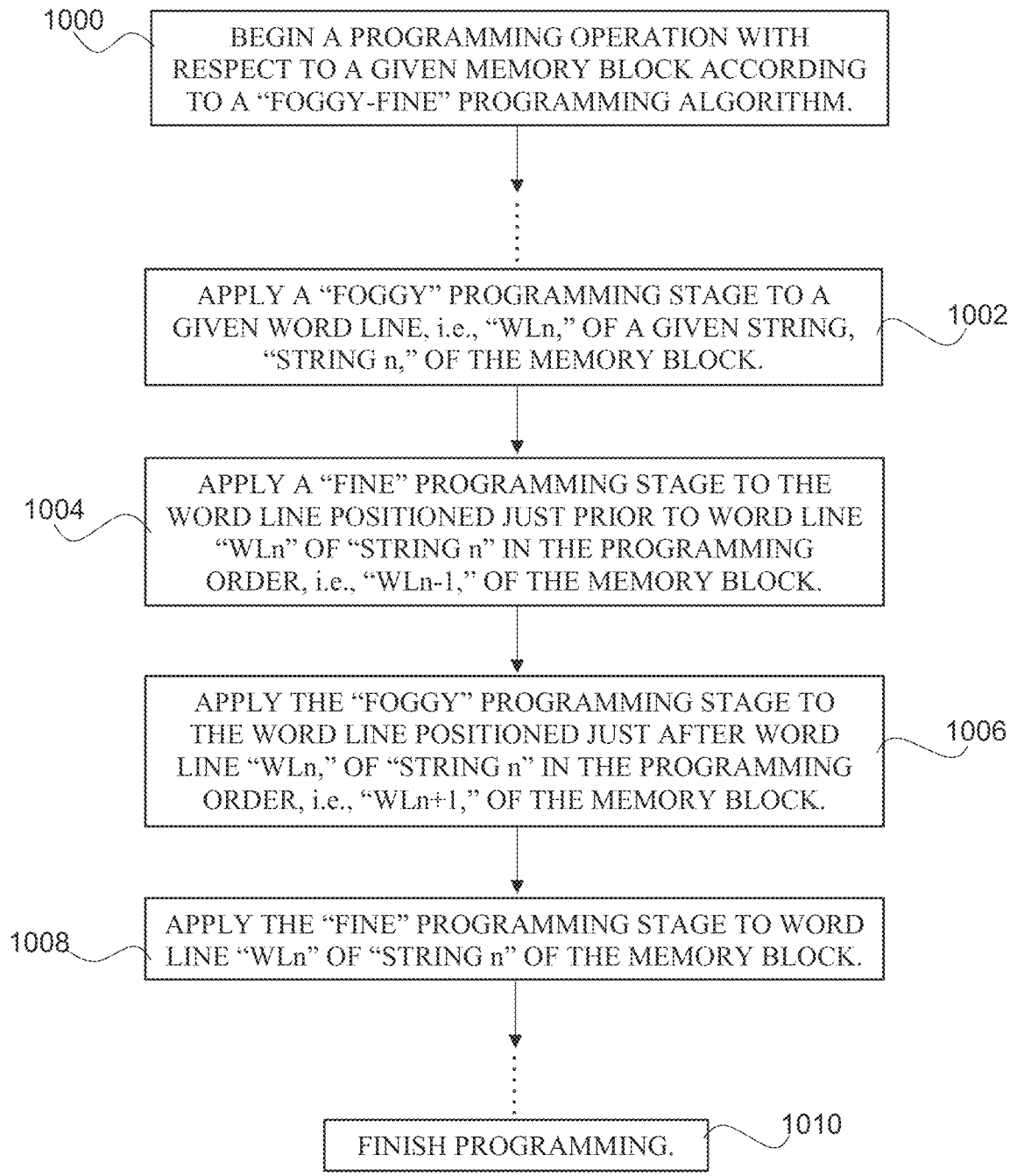
FIG. 18 is a flow diagram that generally illustrates the steps of a "foggy-fine" programming approach that is applied according to a "leap-frog" programming order, in accordance with an exemplary embodiment.
Figure 19:
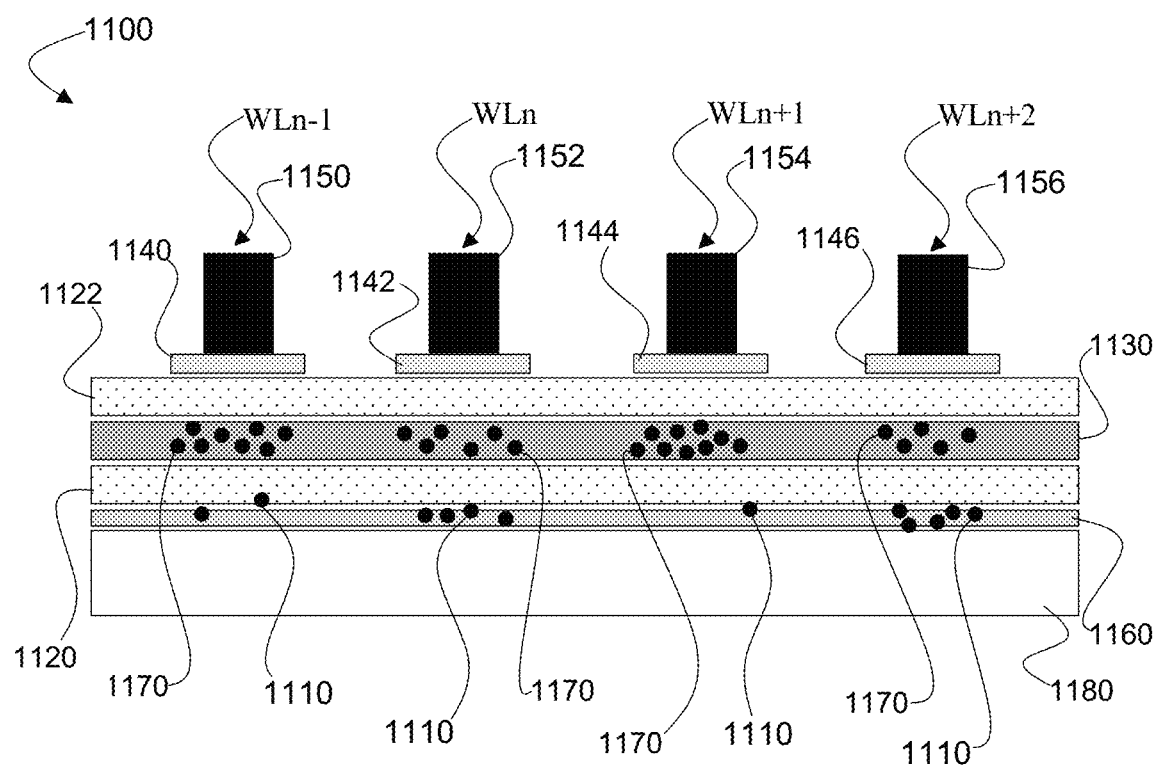
FIG. 19 schematically depicts a representative section of a programmed three-dimensional NAND-type memory block, in accordance with exemplary embodiments.

In FIG. 19, there is generally depicted, according to an exemplary embodiment, a representative section 1100 of a three-dimensional NAND-type memory block. Further, in this particular depiction, section 1100 comprises four memory cells, wherein each memory cell comprises a control gate 1140, 1142, 1144, and 1146, respectively, at an intersection with a respective word line, i.e., word lines 1150, 1152, 1154, and 1156. Further, section 1100 may be comprised of one or more material layers that may include, for example, a charge trapping layer 1130 that may be disposed between two insulating layers 1120, 1122, a channel 1160, and an underlying core oxide layer 1180 formed by deposition. The two insulating layers (1120, 1122) may be comprised of, for example, an oxide material. A specific programming order of the memory cells may be pre-determined according to an assignment protocol that may be stored, for example, within the memory device itself. In this particular embodiment, the programming order, with respect to section 1100, commences at word line 1150 and, if continuing onward therefrom, proceeds to the right (i.e., to word line 1152, then word line 1154, etc.), in a "leap-frog" order during a "foggy-fine" programming algorithm cycle (such as the order described above with respect to FIG. 18). Depicted in FIG. 19 is a current state of section 1100 subsequent to such a programming operation. Accordingly, as shown, a number of electron charges 1170 are present at the charge trapping layer 1130, in accordance with a programmed state. However, as also indicated, several electron charges 1110 may also be trapped at, or near, channel 1160, which parasitically skews the resulting threshold voltage ($V_{th}$) distribution of the associated memory cell as a result of the cumulative loss of the trapped charges 1110 over time. According to certain observations and data, this unintended and parasitic trapping of the electron charges 1110 is the result of, for example, structural irregularities in the memory structure that are introduced during the manufacture or fabrication process. Thus, currently, there is a settled probability that, during any programming operation of a memory structure, some percentage of the electron charges tunneling from the channel region and into a charge trapping layer will become trapped and not reach the charge trapping layer as intended. This resulting shift in the threshold voltage ($V_{th}$) distribution that occurs due to the trapped charges (1110) may damage the reliability and the retention of the programmed data, particularly if various compensatory countermeasures (e.g., error correction) existing at the system level of the memory device fail to sufficiently address this issue. Furthermore, according to certain observations and data, the application of a "foggy-fine" programming algorithm increases the likelihood of electron charges becoming prematurely trapped at the channel region due to the dual programming stages, thereby exacerbating this behavior.

However, as further observed, the trapped condition of the unintentionally trapped charges near, or at, the channel region is dictated by a time constant, or a time period, that is inversely proportional to the energy of the charge. That is to say, charges that have a relatively higher energy have a higher probability of de-trapping from trap sites at a faster rate when compared to charges that have a lower energy. Additionally, as also observed, the energy of a charge is directly correlated to the ambient temperature such that, at relatively lower ambient temperatures, a charge has less energy when comparted to the energy of a charge present at a relatively higher ambient temperature. Based upon these observations, it may be possible to introduce a time delay between one or more programming steps in a multi-stage programming algorithm that typically occur at a rapid pace or sequence, thereby allowing more time for unintentionally trapped charges to de-trap. As the unintentionally trapped charges are subsequently released, they are once again, transportable to the charge trapping layer during a programming operation. An example of such a modified programming operation is generally depicted in the flow diagram that is set forth in FIG. 20, according to an exemplary embodiment. In this particular embodiment, the basic steps of the "leap-frog" programming order in a programming operation conducted according to a "foggy-fine" programming algorithm described above with respect to FIG. 18, are used for illustrative purposes. However, similar time delay modifications to a programming operation may be made to any multi-stage type programming operation.

Figure 20:
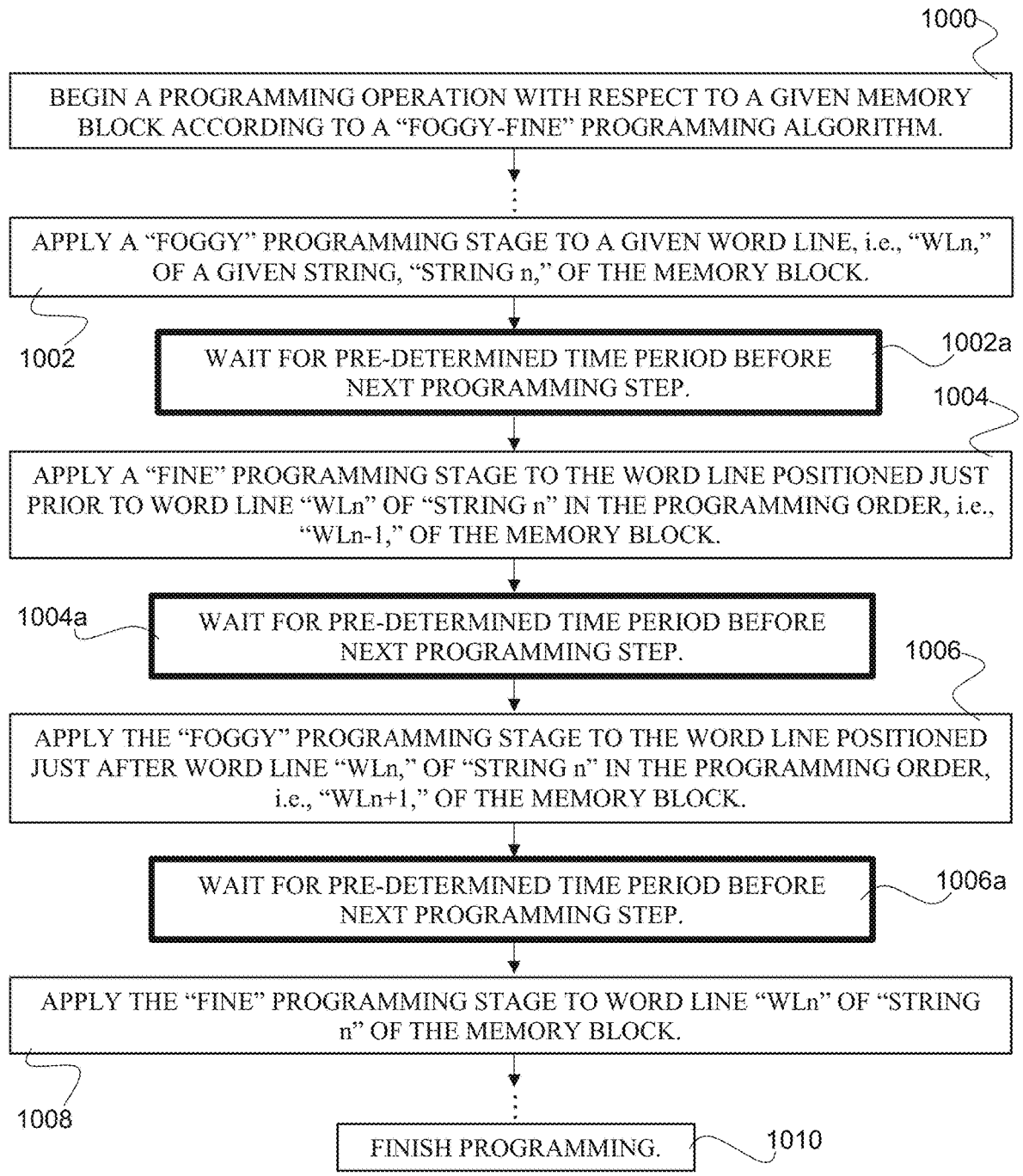
FIG. 20 is a flow diagram that generally illustrates the steps of a "foggy-fine" programming approach that is applied according to a "leap-frog" programming order, in accordance with a different exemplary embodiment.

Accordingly, as indicated in FIG. 20, the programming operation generally set forth therein comprises the same steps 1000, 1002, 1004, 1006, 1008, and 1010 of the programming operation depicted in FIG. 18. However, in contrast to the programming operation depicted in FIG. 18, between each programming stage (i.e., between each application of a "foggy" and then "fine" programming stage), a time delay is introduced. Accordingly, in this particular embodiment, during the programming operation, at step 1002a, the system pauses for a pre-determined amount of time before subsequently proceeding to applying a "fine" programming stage to the word line WLn−1 (as indicated at step 1004). Similarly, at step 1004a, the system again pauses for a pre-determined amount of time before subsequently proceeding to applying a "foggy" programming stage to the word line WLn+1 (as indicated at step 1006). Further, at step 1006a, the system likewise pauses for a pre-determined amount of time before subsequently proceeding to applying a "fine" programming stage to the word line WLn (as indicated at step 1008).

Importantly, the programming operation according to the exemplary embodiment depicted in FIG. 20 is just one potential example in which a time delay may be introduced. However, as stated above, according to the present disclosure, a time delay may be introduced during programming stages within any type of programming operation which involves multiple programming stages. For example, a time delay may be introduced with respect to each of the programming operations depicted in FIGS. 16 and 17.

Further, as described above, the added time delay introduced into a programming operation may be pre-determined according to, for example, certain empirical observations and data made with respect to a particular memory structure, either, or both, during experimentation and/or in situ. Accordingly, the pre-determined time delay period may be precisely optimized according to various performance characteristics of the memory structure that relate to, for example, data reliability (e.g., bit error rate). In addition, according to some embodiments, programming operations in which as time delay is introduced at multiple points during the programming cycle, the pre-determined amount of time delay applied at one point during the programming cycle may differ from a pre-determined amount of time delay that is applied at a different point during the programming cycle. Further, according to other certain embodiments, the time delay period may be dynamically determined and may change throughout the life cycle of the memory structure. In addition, as discussed above, the time delay is intended to allow for the unintentionally trapped charges to be released from their trapped condition according to a probabilistic function. Accordingly, the amount of time that is required to achieve this objective is related to, and dependent upon, the respective energy of each trapped charge.

Additionally, it is acknowledged that the introduction of a time delay according to the present disclosure may negatively impact the performance of the memory structure due to the additional programming time ($T_{prog}$), which slows the programming speed. Accordingly, the application of the time delay may be judicially used such that it is only applied in limited circumstances such as, for example, when the time delay is less noticeable (e.g., when the programming operation is conducted with respect to background write operations such as, for example, folding, block relocation, etc.) Further, the programming order may be modified such that the event of a time delay is transparent to the host/user. In addition, the introduction of the time delay may be focused specifically on areas of a memory structure that are inherently less reliable and durable, such as the outermost word lines or strings of a memory structure (as they oftentimes exhibit non-uniform electrical characteristics due to, for example, the variations in oxide material thickness as a result of the manufacturing process). Furthermore, the time delay may be discernibly or selectively introduced during junctures in time that coincide with another natural delay in the programming operation. In addition, the time delay introduced for purposes of this disclosure may also be leveraged to perform other system operations that can be accomplished during the wait.

The above discussion is meant to be illustrative of the principles and various embodiments of the present invention. Numerous variations and modifications will become apparent to those skilled in the art once the above disclosure is fully appreciated. For example, although on-memory controllers have been described as performing or controlling the methods that are described above, any processor executing software within a host system can perform the methods described above without departing from the scope of the disclosure. In particular, the methods and techniques described herein as performed in the on-memory controller(s), may also be performed in a host. Furthermore, the methods and concepts disclosed herein may be applied to other types of persistent memories other than flash. It is intended that the following claims be interpreted to embrace all such variations and modifications.

What is claimed is:

1. A method for multi-stage programming of a non-volatile memory structure, comprising:
   initiating a programming operation with respect to a memory block comprising a plurality of NAND-type memory cells;
   applying a programming algorithm to the memory block, wherein the programming algorithm comprises at least a first programming stage, wherein the first programming stage is a foggy programming stage with a first plurality of programming pulses that increase between programming pulses by a first step size to program the memory cells to a plurality of intermediate data states, and a second programming stage, wherein the second programming stage is a fine programming stage with a second plurality of programming pulses that increase between programming pulses by a second step size that is less than the first step size to program the memory cells from the plurality of intermediate data states to a plurality of final data states; and
   between the foggy programming stage with the first plurality of programming pulses and the fine programming stage with the second plurality of programming pulses, applying a time delay according to a pre-determined amount of time, wherein the pre-determined amount of time is dynamically determined and changes according to a probabilistic function in order to permit de-trapping of any charges unintentionally trapped within a memory cell as a result of the first programming stage.

2. The method according to claim 1, wherein the:
   first programming stage is applied to a first word line of the memory block according to a programming order; and
   second programming stage is applied to a word line positioned just prior to the first word line according to the programming order.

3. The method according to claim 1, further comprising applying the time delay after the second programming stage.

4. The method according to claim 1, wherein the time delay is applied only to a specific portion of the memory block.

5. The method according to claim 1, wherein the pre-determined amount of time is further determined according to a desired decrease in a measured error bit rate count of the programming operation.

6. The method according to claim 1, wherein the pre-determined amount of time is in the range of 100 microseconds and five minutes.

7. A memory controller, comprising:
   a communication pathway configured to couple to a memory block of a non-volatile memory structure, wherein the memory block comprises a plurality of NAND-type memory cells; and
   the memory controller is configured to:
      initiate a programming operation with respect to the memory block;
      apply a programming algorithm to the memory block, wherein the programming algorithm comprises at least a first programming stage, wherein the first programming stage is a foggy programming stage with a first plurality of programming pulses that increase by a first step size to program the memory cells to a plurality of intermediate data states, and a second programming stage, wherein the second programming stage is a fine programming stage with a second plurality of programming pulses that increase between programming pulses by a second step size that is less than the first step size to program the memory cells from the plurality of intermediate data states to a plurality of final data states; and between the foggy programming stage with the first plurality of programming pulses and the fine programming stage with the second plurality of programming pulses, apply a time delay according to a pre-determined amount of time, wherein the pre-determined amount of time is dynamically determined and changes according to a probabilistic function in order to permit de-trapping of any charges unintentionally trapped within a memory cell as a result of the first programming stage.

8. The memory controller according to claim 7, wherein the memory controller is further configured to:

apply the first programming stage to a first word line of the memory block according to a programming order; and apply the second programming stage to a word line positioned just prior to the first word line according to the programming order.

9. The memory controller according to claim 7, wherein the memory controller is further configured to apply the time delay after the second programming stage.

10. The memory controller according to claim 7, wherein the pre-determined amount of time is further determined according to a desired decrease in a measured error bit rate count of the programming operation.

11. The memory controller according to claim 7, wherein the time delay is applied only to a specific portion of the memory block.

12. A non-volatile memory system, comprising:

a memory block comprising a population of NAND-type memory cells; and a memory controller coupled to the memory array and configured to:

initiate a programming operation with respect to the memory block;

apply a programming algorithm to the memory block, wherein the programming algorithm comprises at least a first programming stage, wherein the first programming stage is a foggy programming stage with a first plurality of programming pulses that increase between programming pulses by a first step size to program the memory cells to a plurality of intermediate data states, and a second programming stage, wherein the second programming stage is a fine programming stage with a second plurality of programming pulses that increase between programming pulses by a second step size that is less than the first step size to program the memory cells from the plurality of intermediate data states to a plurality of final data states; and between the foggy programming stage with the first plurality of programming pulses and the fine programming stage with the second plurality of programming pulses, apply a time delay according to a pre-determined amount of time, wherein the pre-determined amount of time is dynamically determined and changes according to a probabilistic function to permit de-trapping of any charges unintentionally trapped within a memory cell as a result of the first programming stage.

13. The non-volatile memory system according to claim 12, wherein the memory controller is further configured to:

apply the first programming stage to a first word line of the memory block according to a programming order; and apply the second programming stage to a word line positioned just prior to the first word line according to the programming order.

14. The non-volatile memory system according to claim 12, wherein the memory controller is further configured to apply the time delay after the second programming stage.

15. The non-volatile memory system according to claim 12, wherein the pre-determined amount of time is further determined according to a desired decrease in a measured error bit rate count of the programming operation.

16. The non-volatile memory system according to claim 12, wherein the time delay is applied only to a specific portion of the memory block.

17. The non-volatile memory system according to claim 12, wherein the pre-determined amount of time is in the range of 100 microseconds and five minutes.

* * * * *